United States Patent
Fujii et al.

(10) Patent No.: US 10,185,237 B2
(45) Date of Patent: Jan. 22, 2019

(54) ELECTROPHOTOGRAPHIC PHOTORECEPTOR, ELECTROPHOTOGRAPHIC PHOTORECEPTOR CARTRIDGE, IMAGE FORMING APPARATUS, AND POLYARYLATE RESIN

(71) Applicant: Mitsubishi Chemical Corporation, Chiyoda-ku (JP)

(72) Inventors: Akiteru Fujii, Kanagawa (JP); Rui Zhao, Kanagawa (JP); Yuka Nagao, Kanagawa (JP); Atsushi Yoshizawa, Kanagawa (JP); Yuuta Kumano, Kanagawa (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 14/992,603

(22) Filed: Jan. 11, 2016

(65) Prior Publication Data

US 2016/0124327 A1    May 5, 2016

Related U.S. Application Data

(63) Continuation of application No. PCT/JP2014/068484, filed on Jul. 10, 2014.

(30) Foreign Application Priority Data

Jul. 12, 2013 (JP) .................. 2013-146651
Sep. 12, 2013 (JP) .................. 2013-189584
Oct. 1, 2013 (JP) .................. 2013-206624

(51) Int. Cl.
*G03G 5/047* (2006.01)
*C08G 63/193* (2006.01)
(Continued)

(52) U.S. Cl.
CPC .......... *G03G 5/047* (2013.01); *C08G 63/193* (2013.01); *G03G 5/056* (2013.01); *G03G 5/0612* (2013.01); *G03G 5/0696* (2013.01)

(58) Field of Classification Search
None
See application file for complete search history.

(56) References Cited

U.S. PATENT DOCUMENTS

| | | |
|---|---|---|
| 4,447,592 A | 5/1984 | Harris, Jr. |
| 5,302,479 A | 4/1994 | Daimon et al. |

(Continued)

FOREIGN PATENT DOCUMENTS

| | | | |
|---|---|---|---|
| CN | 1846176 A | | 10/2006 |
| CN | 102807475 A | * | 12/2012 |

(Continued)

OTHER PUBLICATIONS

Printout of http://www.guidechem.com/cas-79/79-97-0.html, as archived by the Internet Archive on Aug. 10, 2014.*

(Continued)

*Primary Examiner* — Joshua D Zimmerman
(74) *Attorney, Agent, or Firm* — Oblon, McClelland, Maier & Neustadt, L.L.P.

(57) ABSTRACT

An electrophotographic photoreceptor comprises a conductive support and, at least a photosensitive layer on the conductive support, wherein the photosensitive layer includes a polyarylate resin and the polyarylate resin has a repeating structure represented by formula (1), and the amount of bisphenol residues represented by formula (3) after the polyarylate resin is hydrolyzed, is 0.2% to 1%, in terms of intensity ratio, based on the total amount of bisphenol residues represented by formula (2) and formula (3) after the polyarylate resin is hydrolyzed, the bisphenol (Continued)

residues being detected with a gas chromatograph employing a hydrogen flame ionization detector (FID).

14 Claims, 1 Drawing Sheet

(51) Int. Cl.
   *G03G 5/05* (2006.01)
   *G03G 5/06* (2006.01)

(56) References Cited

U.S. PATENT DOCUMENTS

| | | | |
|---|---|---|---|
| 5,393,629 | A | 2/1995 | Nukada et al. |
| 5,885,737 | A | 3/1999 | Tanaka |
| 5,897,250 | A | 4/1999 | Hirai et al. |
| 5,932,722 | A | 8/1999 | Hirai et al. |
| 6,335,132 | B1 | 1/2002 | Tanaka et al. |
| 2002/0001765 | A1 | 1/2002 | Tanaka et al. |
| 2003/0054273 | A1* | 3/2003 | Tanaka ............... C09B 67/0019 430/78 |
| 2006/0073400 | A1 | 4/2006 | Kumano |
| 2006/0292469 | A1 | 12/2006 | Nagasaka et al. |
| 2009/0081570 | A1* | 3/2009 | Kumano ............... G03G 5/056 430/96 |

FOREIGN PATENT DOCUMENTS

| | | |
|---|---|---|
| JP | 56-135844 | 10/1981 |
| JP | 60-8316 | 1/1985 |
| JP | 3-6567 | 1/1991 |
| JP | 9-22126 | 1/1997 |
| JP | 9-319129 | 12/1997 |
| JP | 10-207085 | 8/1998 |
| JP | 10-288845 A | 10/1998 |
| JP | 11-209687 A | 8/1999 |
| JP | 2000-292956 A | 10/2000 |
| JP | 2001-13698 A | 1/2001 |
| JP | 2001-66804 | 3/2001 |
| JP | 3166293 | 5/2001 |
| JP | 2001-288188 | 10/2001 |
| JP | 2001-343761 | 12/2001 |
| JP | 2005-77500 | 3/2005 |
| JP | 2005-99791 A | 4/2005 |
| JP | 3639691 | 4/2005 |
| JP | 2006-53262 | 2/2006 |
| JP | 2006-84941 A | 3/2006 |
| JP | 2006-290959 | 10/2006 |
| JP | 2007-148294 A | 6/2007 |
| JP | 2007-316099 | 12/2007 |
| JP | 2008-121007 A | 5/2008 |
| JP | 2010-43201 A | 2/2010 |
| JP | 2010-77315 | 4/2010 |
| JP | 2013-72077 A | 4/2013 |
| WO | WO 2005/024521 A1 | 3/2005 |

OTHER PUBLICATIONS

Combined Chinese Office Action and Search Report dated Aug. 3, 2016 in Patent Application No. 201480039463.7 (with English Translation and English Translation of Categories of Cited Documents).

International Search Report dated Sep. 22, 2014 in PCT/JP2014/068484, filed Jul. 10, 2014 (with English Translation).

Written Opinion dated Sep. 22, 2014 in PCT/JP2014/068484, filed Jul. 10, 2014.

Office Action dated Sep. 20, 2016 in Japanese Patent Application No. 2013-146651 (with unedited computer generated English translation).

Decision of Refusal dated Mar. 14, 2017, in Japanese Patent Application No. 2013-146651 filed Jul. 12, 2013 (with machine English translation).

Office Action dated Feb. 20, 2018 in Japanese Patent Application No. 2014-201659 with English translation, 9 pages.

Japanese Office Action dated Sep. 19, 2017 in Patent Application No. 2014-184503 (with English translation).

Notification of Reasons for Refusal dated May 8, 2018, in Japanese Patent Application No. 2014-184503 filed Sep. 10, 2014 (with machine English translation), citing document AO.

* cited by examiner

[Fig. 1]
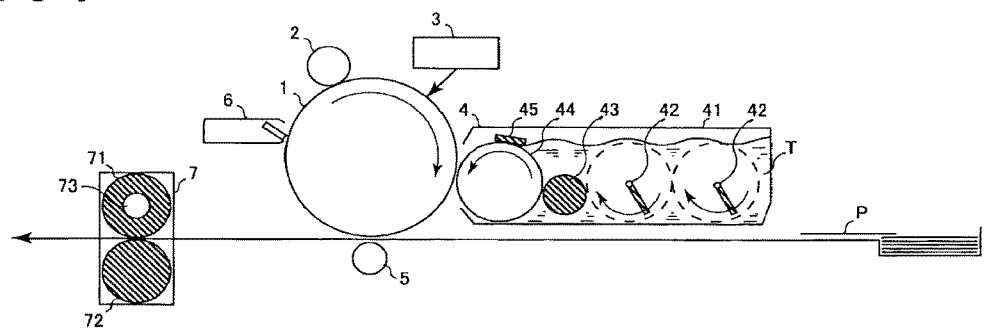
[Fig. 2]
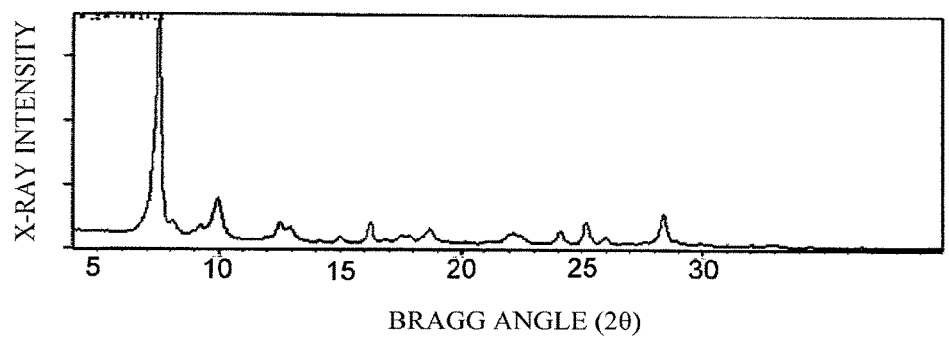
[Fig. 3]
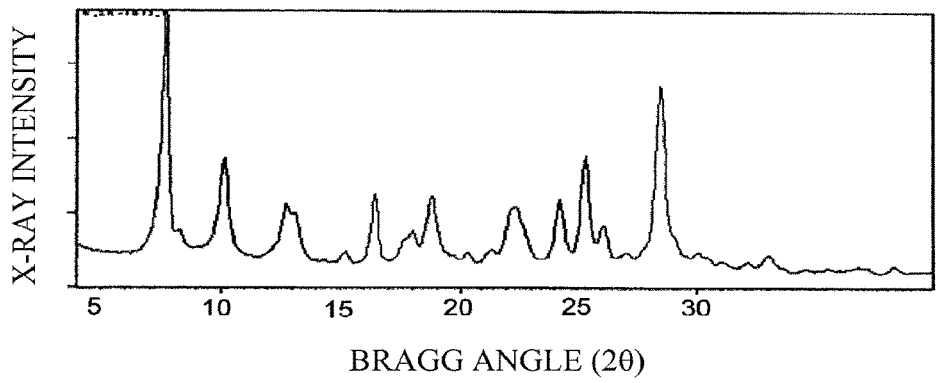

ELECTROPHOTOGRAPHIC PHOTORECEPTOR, ELECTROPHOTOGRAPHIC PHOTORECEPTOR CARTRIDGE, IMAGE FORMING APPARATUS, AND POLYARYLATE RESIN

TECHNICAL FIELD

The present invention relates to an electrophotographic photoreceptor, an electrophotographic photoreceptor cartridge, and an image forming apparatus, which each employ both a polyarylate resin having a specific structure and obtained by polymerizing given starting-material monomers, specifically, a polyarylate resin obtained by polymerizing starting-material monomers including a bisphenol which has a specific structure and has a controlled purity, and hydroxygallium phthalocyanine.

BACKGROUND ART

Polyarylate resins are known as one class of amorphous engineering plastics having excellent mechanical strength. Recently in the electrical and electronic fields, etc., there is a growing desire for a resin for coating films which is excellent in terms of transparency and wear resistance. In the field of electrophotography, among these, use of polyarylate resins having various structures as binder resins for organic photoreceptors is being investigated.

With respect to application of polyarylate resins to electrophotographic photoreceptors, it has been reported that by using U-Polymer (trade name), which is a commercial polyarylate resin, as the binder resin of a photosensitive layer, the sensitivity is improved as compared with the case of using polycarbonate resins used in many electrophotographic photoreceptors (see patent document 1). However, coating fluids prepared by dissolving the polyarylate resin have low stability and there have been cases where production through coating-fluid application is difficult. For overcoming this problem, it has been reported that by using a polyarylate resin obtained using a divalent phenol ingredient having a specific structure as a binder resin, the stability of coating solutions used for producing electrophotographic photoreceptors is improved and the mechanical strength and wear resistance of the electrophotographic photoreceptors are improved (see patent documents 2 to 5).

Meanwhile electrophotographic photoreceptors are repeatedly used in electrophotographic processes, namely, in cycles each including charge, exposure, development, transfer, cleaning, erase, etc., and deteriorate due to various loads imposed thereon during the cycles. Examples of such loads include a high-voltage load due to the corona charging device which is in common use as a charging device, a chemical load due to the ozone and NOx, which are highly oxidative and generate during discharge, an electrical load due to the carriers yielded by image-wise exposure to light, a high-voltage load during transfer, a mechanical load due to toners, carriers, and paper components, and a photochemical load imposed on the photosensitive layer composition by the erase light or external light. Consequently, for inhibiting the image characteristics from fluctuating when an electrophotographic process is repeated many times, it is necessary to heighten the resistance to those loads. With respect to the resistance of photoreceptors to such loads during repeated use, there are cases where even when there is only a slight difference in photoreceptor material, accumulation of slight damage results in damage which affects the image characteristics. In particular, the recent image forming apparatus are increasingly designed to accommodate increases in image quality, and the image characteristics are hence affected even by slight differences in potential. It is therefore necessary to sufficiently take account not only of differences in initial performance but also of differences in performance during endurance. For example, although no report has been made on any influence of by-products contained in the divalent phenol ingredient in the polyarylate resin on the image characteristics during endurance use, the influences thereof must be sufficiently taken into account because the by-products once polymerized and incorporated into the polymer cannot be removed.

Specifically, with respect to by-products in the divalent phenol ingredient in the polyarylate resin in the case where the polyarylate resin is used in the charge transport layer of a multilayer type electrophotographic photoreceptor, no report has been made on not only how the by-products behave in the charge transport layer but also what functions the by-products perform in the vicinity of the charge generation layer/charge transport layer interface. Especially with respect to image defects whereby image residues remain, such as image memory and ghost images, it has been pointed out that charges may be trapped in the vicinity of the charge generation layer/charge transport layer interface to exert influences on the next step (patent documents 6 and 7). The influences thereof are hence a matter of concern.

Meanwhile, from the standpoint of image stabilization, there recently is a desire for a reduction in the dependence of image formation on environmental fluctuations, in particular, humidity. It is becoming especially important that even under such conditions that humidity fluctuates considerably, a constant image density should be maintained over time and the density be kept even throughout the whole image. For example, there is a problem in that during the period when the image forming process is at a stop, the moisture contained, for example, in the toner, and the like of the developing device affects the sensitivity of that portion of the photoreceptor which faces the developing device, thereby causing band unevenness in the images. Among the titanyl phthalocyanines that have hitherto been used extensively as charge generation substances, titanyl phthalocyanine having the Y-type crystal form, which shows highest sensitivity, is known to have a large humidity dependence of electrical properties. Gallium phthalocyanines having a smaller humidity dependence have come to be used as a substitute therefor. In particular, hydroxygallium phthalocyanines having specific crystal forms and showing high sensitivity have been proposed (patent documents 8 and 9). However, there is no report on influences exerted on the electrical properties and image characteristics of an electrophotographic photoreceptor in the case where use is made of by-products contained in the divalent phenol ingredient in a polyarylate resin such as that described above and of the hydroxygallium phthalocyanines.

PRIOR ART DOCUMENTS

Patent Documents

Patent Document 1: JP-A-56-135844
Patent Document 2: JP-A-3-6567
Patent Document 3: JP-A-9-22126
Patent Document 4: JP-A-9-319129
Patent Document 5: JP-A-2006-290959
Patent Document 6: JP-A-2001-66804
Patent Document 7: JP-A-2007-316099

Patent Document 8: Japanese Patent No. 3166293
Patent Document 9: Japanese Patent No. 3639691

SUMMARY OF THE INVENTION

Problems that the Invention is to Solve

Patent documents 2 to 5 indicate that according to the techniques described therein, an electrophotographic photoreceptor having improved solubility, solvent crack resistance, mechanical properties, etc. is obtained by using a polyarylate resin produced using a specific bisphenol. However, there are cases where the electrophotographic photoreceptor deteriorates in electrical property when used repeatedly. There also are cases where image defects such as image memory and ghost images occur. An object of the invention is to provide an electrophotographic photoreceptor which has excellent electrical properties and image characteristics during repeated use. Another object is to provide an electrophotographic cartridge and an image forming apparatus each employing the electrophotographic photoreceptor.

Means for Solving the Problems

The present inventors diligently made investigations in order to develop an electrophotographic photoreceptor capable of overcoming the problems described above, specifically, on the proportion of a bisphenol ingredient having a specific structure in a polyarylate resin having a specific structure, the purity of a starting-material monomer to be used in polymerization, and by-products of a specific structure contained in the starting-material monomer. As a result, the inventors have discovered that by regulating the content of by-products in a starting-material monomer so as to be within a certain range, improvements in electrical property and image characteristics can be attained with the polyarylate resin produced by polymerizing the monomer, as compared with the case of using polyarylate resins produced using conventional starting-material monomers, in the case where the polyarylate resin thus produced is used in the charge transport layer of a multilayer type electrophotographic photoreceptor and where hydroxygallium phthalocyanine is used in the charge generation layer in the electrophotographic photoreceptor. The present invention has been thus achieved. Namely, essential points of the invention reside in the following.

<1>
An electrophotographic photoreceptor comprising a conductive support and, at least a photosensitive layer on the conductive support, wherein the photosensitive layer includes a polyarylate resin and the polyarylate resin has a repeating structure represented by formula (1), and the amount of bisphenol residues represented by formula (3) after the polyarylate resin is hydrolyzed, is 0.2% to 1%, in terms of intensity ratio, based on the total amount of bisphenol residues represented by formula (2) and formula (3) after the polyarylate resin is hydrolyzed, the bisphenol residues being detected with a gas chromatograph employing a hydrogen flame ionization detector (FID):

[Chem. 1]

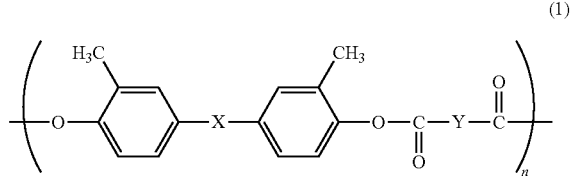

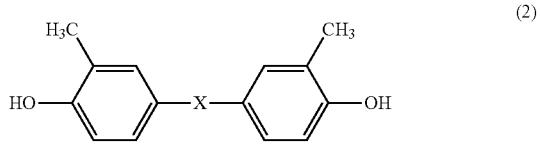

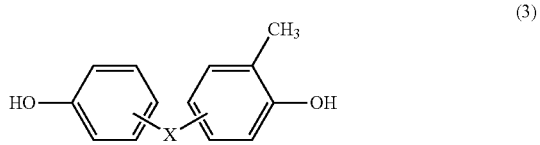

in formulae (1) to (3), Y each independently represent at least one divalent group selected from an m-phenylene group, a p-phenylene group, and a divalent group configured of two p-phenylene groups bonded to each other by an oxygen atom; n indicates the number of repetitions; and X each represent a single bond, —$CR^1R^2$—, O, CO, or S, and $R^1$ and $R^2$ each independently represent a hydrogen atom, a methyl group, or an ethyl group, or $R^1$ and $R^2$ represent a cyclohexylidene group formed by the $R^1$ and $R^2$ bonded to each other.

<2>
The electrophotographic photoreceptor according to the <1>above, wherein the amount of bisphenol residues represented by formula (3) which are detected with the gas chromatograph employing a hydrogen flame ionization detector (FID) is 0.3% to 0.8%, in terms of intensity ratio, based on the total amount of bisphenol residues represented by formula (2) and formula (3).

<3>
The electrophotographic photoreceptor according to the <1>above, wherein the amount of bisphenol residues represented by formula (3) which are detected with the gas chromatograph employing a hydrogen flame ionization detector (FID) is 0.4% to 0.8%, in terms of intensity ratio, based on the total amount of bisphenol residues represented by formula (2) and formula (3).

<4>
The electrophotographic photoreceptor according to any one of the <1> to <3>above, wherein the amount of bisphenol residues represented by formula (4) after the polyarylate resin is hydrolyzed, is 15 ppm less than, in terms of intensity ratio, based on the total amount of bisphenol residues represented by formula (2), formula (3), and formula (4) after the polyarylate resin is hydrolyzed, the bisphenol residues being detected with the gas chromatograph employing a hydrogen flame ionization detector (FID):

[Chem. 2]

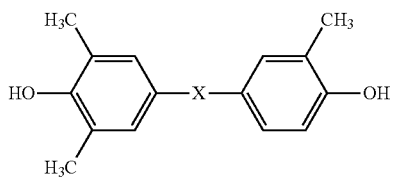

(4)

in formula (4), X represents a single bond, —CR$^1$R$^2$—, O, CO, or S, and R$^1$ and R$^2$ each independently represent a hydrogen atom, a methyl group, or an ethyl group, or R$^1$ and R$^2$ represent a cyclohexylidene group formed by the R$^1$ and R$^2$ bonded to each other.)

<5>

An electrophotographic photoreceptor comprising a conductive support and, at least a photosensitive layer on the conductive support, wherein the photosensitive layer includes a polyarylate resin and the polyarylate resin has a repeating structure represented by formula (1), and the amount of bisphenol residues represented by formula (4) after the polyarylate resin is hydrolyzed, is 10 ppm or less, in terms of intensity ratio, based on the total amount of bisphenol residues represented by formula (2), formula (3), and formula (4) after the polyarylate resin is hydrolyzed, the bisphenol residues being detected with a gas chromatograph employing a hydrogen flame ionization detector (FID):

[Chem. 3]

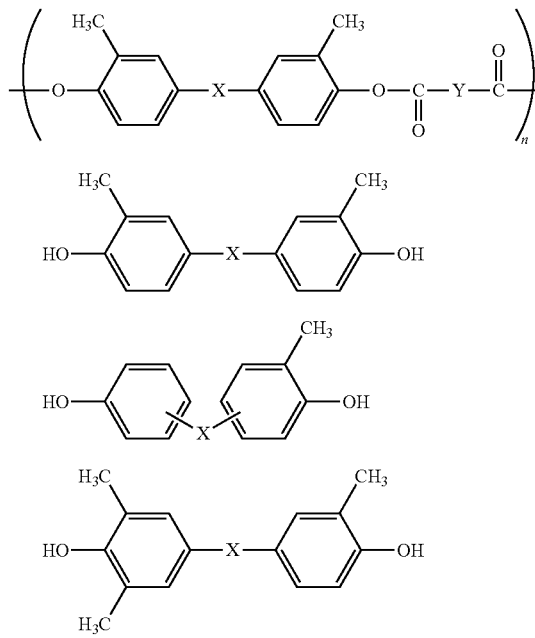

in formulae (1) to (3), Y each independently represent at least one divalent group selected from an m-phenylene group, a p-phenylene group, and a divalent group configured of two p-phenylene groups bonded to each other by an oxygen atom; n indicates the number of repetitions; and X each represent a single bond, —CR$^1$R$^2$—, O, CO, or S, and R$^1$ and R$^2$ each independently represent a hydrogen atom, a methyl group, or an ethyl group, or R$^1$ and R$^2$ represent a cyclohexylidene group formed by the R$^1$ and R$^2$ bonded to each other, in formula (4), X represents a single bond, —CR$^1$R$^2$—, O, CO, or S, and R$^1$ and R$^2$ each independently represent a hydrogen atom, a methyl group, or an ethyl group, or R$^1$ and R$^2$ represent a cyclohexylidene group formed by the R$^1$ and R$^2$ bonded to each other.

<6>

The electrophotographic photoreceptor according to any one of the <1> to <5>above, wherein the photosensitive layer is a laminate of a charge transport layer and a charge generation layer.

<7>

The electrophotographic photoreceptor according to the <6>, wherein the charge transport layer contains at least one charge transport substance selected from the compounds represented by the following formulae (CT-1) to (CT-3):

[Chem. 4]

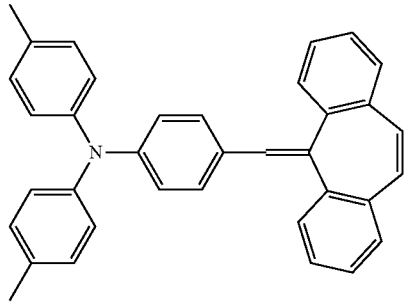

(CT1)

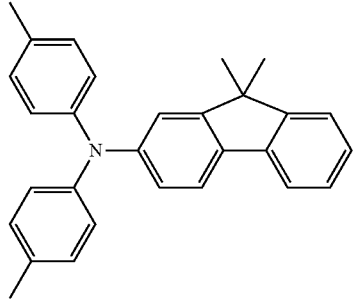

(CT2)

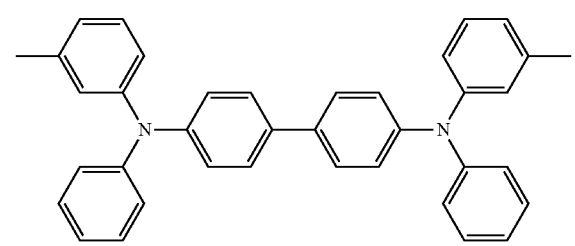

(CT3)

<8>

The electrophotographic photoreceptor according to the <6> or <7>above, wherein the charge generation layer contains hydroxygallium phthalocyanine, the hydroxygallium phthalocyanine being hydroxygallium phthalocyanine crystals which, in analysis by X-ray diffractometry using a CuKα line, shows an intense diffraction peak at a Bragg angle (2θ±0.2) of 28.3°.

<9>
The electrophotographic photoreceptor according to the <8>above, wherein the hydroxygallium phthalocyanine is synthesized using a non-halogen solvent.
<10>
The electrophotographic photoreceptor according to the <8> or <9>above, wherein the hydroxygallium phthalocyanine pigment isolated from the charge generation layer has an α-chloronaphthalene content of 0.1 ng/cm$^2$ or less.
<11>
An image forming apparatus which employs the electrophotographic photoreceptor according to any one of the <1> to <10>above.
<12>
The image forming apparatus according to the <11>above, wherein in an electrophotographic process, a toner developed on the photoreceptor is directly transferred to a printing medium without via an intermediate transfer body.
<13>
A cartridge for image forming apparatus, the cartridge employing the electrophotographic photoreceptor according to any one of the <1> to <10>above.
<14>
A polyarylate resin having a repeating structure represented by formula (1) and obtained by polymerizing starting-material monomers which include a bisphenol represented by formula (2), wherein the content of bisphenol represented by formula (3) in the starting-material monomers is 0.2% to 1% in terms of intensity ratio, the bisphenol represented by formula (3) being detected with a gas chromatograph employing a hydrogen flame ionization detector (FID):

[Chem. 5]

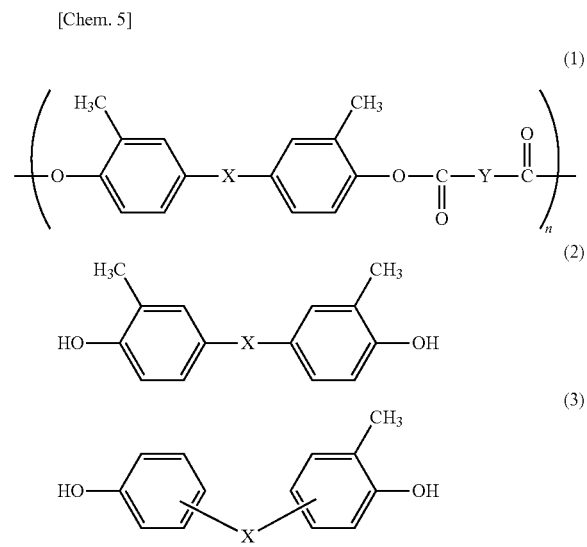

in formulae (1) to (3), Y each independently represent at least one divalent group selected from an m-phenylene group, a p-phenylene group, and a divalent group configured of two p-phenylene groups bonded to each other by an oxygen atom; n represents an integer of 1 or larger; and X each represent a single bond, —CR$^1$R$^2$—, O, CO, or S, and R$^1$ and R$^2$ each independently represent a hydrogen atom, a methyl group, or an ethyl group, or R$^1$ and R$^2$ represent a cyclohexylidene group formed by the R$^1$ and R$^2$ bonded to each other.

<15>
The polyarylate resin according to the <14>above, wherein the amount of bisphenol residues represented by formula (4) after the polyarylate resin is hydrolyzed, which are detected with the gas chromatograph employing a hydrogen flame ionization detector (FID) is 10 ppm or less, in terms of intensity ratio, based on the total amount of bisphenol residues represented by formula (2), formula (3), and formula (4) after the polyarylate resin is hydrolyzed:

[Chem. 6]

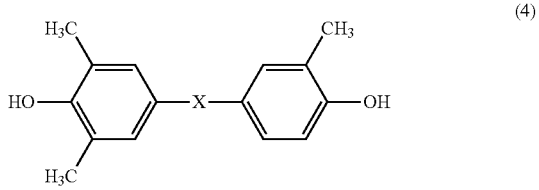

in formula (4), X represents a single bond, —CR$^1$R$^2$—, O, CO, or S, and R$^1$ and R$^2$ each independently represent a hydrogen atom, a methyl group, or an ethyl group, or R$^1$ and R$^2$ represent a cyclohexylidene group formed by the R$^1$ and R$^2$ bonded to each other.

<16>
The polyarylate resin according to the <14> or <15>above, wherein the bisphenol represented by formula (3) is a bisphenol represented by formula (3a):

[Chem. 7]

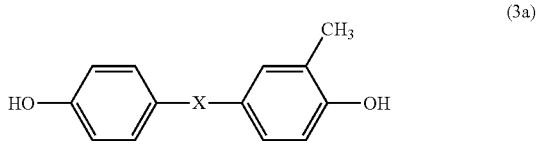

in formula (3a), X represents a single bond, —CR$^1$R$^2$—, O, CO, or S, and R$^1$ and R$^2$ each independently represent a hydrogen atom, a methyl group, or an ethyl group, or R$^1$ and R$^2$ represent a cyclohexylidene group formed by the R$^1$ and R$^2$ bonded to each other.

<17>
The polyarylate resin according to any one of the <14> to <16>above, wherein the starting-material monomers have a bisphenol purity of 99% or higher.

Effects of the Invention

According to the invention, an electrophotographic photoreceptor, electrophotographic photoreceptor cartridge, and image forming apparatus, which each have excellent electrical properties and a small humidity dependence, are less apt to cause image memory or ghost images, and attain excellent image stability, are obtained.

BRIEF DESCRIPTION OF THE DRAWINGS

FIG. 1 is a diagrammatic view which shows one example of image forming apparatus employing the electrophotographic photoreceptor of the invention.

FIG. 2 is an X-ray diffraction pattern of hydroxygallium phthalocyanine (A), which is described in Production Example 1 according to the invention.

FIG. 3 is an X-ray diffraction pattern of hydroxygallium phthalocyanine (B), which is described in Production Example 2 according to the invention.

MODES FOR CARRYING OUT THE INVENTION

Modes for carrying out the invention (hereinafter referred to as embodiments of the invention) are explained below in detail. The invention should not be construed as being limited to the following embodiments and can be variously modified within the scope of the spirit of the invention.

In this description, "% by mass" has the same meaning as "% by weight", "ppm by mass" has the same meaning as "ppm by weight", and "parts by mass" has the same meaning as "parts by weight".

<<1. Polyarylate Resin>>
<Structure of the Polyarylate Resin>

The polyarylate resin of the invention has a repeating structure represented by formula (1), and can be obtained by polymerizing starting-material monomers including a bisphenol represented by formula (2).

[Chem. 8]

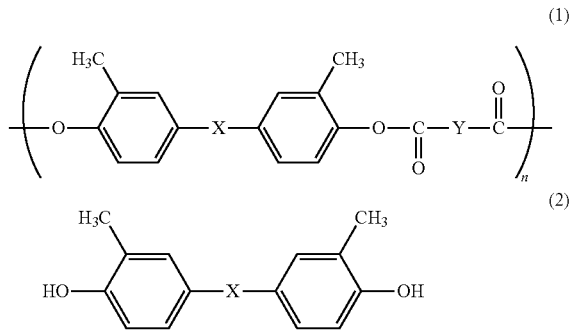

(1)

(2)

In formula (1), Y represents at least one divalent group selected from an m-phenylene group, a p-phenylene group, and a divalent group configured of two p-phenylene groups bonded to each other by an oxygen atom. Specifically, examples of the dicarboxylic acid residues of the polyarylate resin represented by formula (1) include terephthalic acid, isophthalic acid, and (diphenyl ether)-4,4'-dicarboxylic acid. These dicarboxylic acid residues can be used in combination according to need. Preferred of these is a combination of terephthalic acid and isophthalic acid, from the standpoint of mechanical property. In the case of using terephthalic acid and isophthalic acid in combination, the proportion therebetween is preferably from 10/90 to 90/10 (molar ratio), more preferably from 25/75 to 75/25 (molar ratio), even more preferably from 35/65 to 65/35 (molar ratio).

In formulae (1) and (2), X each represent a single bond, $-CR^1R^2-$, O, CO, or S. $R^1$ and $R^2$ each independently represent a hydrogen atom, a methyl group, or an ethyl group, or $R^1$ and $R^2$ represent a cyclohexylidene group formed by the $R^1$ and $R^2$ bonded to each other. Symbol n indicates the number of repetitions.

The polyarylate resin of the invention is not particularly limited so long as this resin contains a repeating structure represented by formula (1) in the molecular structure thereof. For example, the polyarylate resin may be one which has a repeating structure represented by formula (1) as the only repeating structure, or may be a copolymer which has a repeating structure represented by formula (1) and a repeating structure that is not a repeating structure represented by formula (1). Preferred examples of such copolymers include copolymers which contain a repeating structure represented by formula (1) and a repeating structure represented by the following formula (1a).

[Chem. 9]

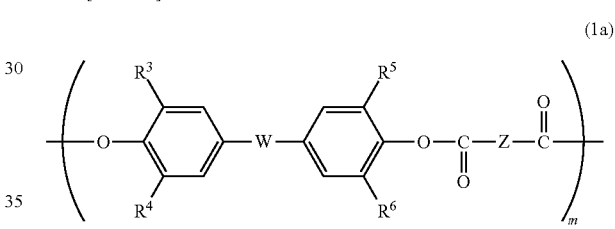

(1a)

(In formula (1a), Z represents at least one divalent group selected from an m-phenylene group, a p-phenylene group, and a divalent group configured of two p-phenylene groups bonded to each other by an oxygen atom. $R^3$ to $R^6$ each independently represent a hydrogen atom or a methyl group. W represents a single bond, $-CR^7R^8-$, O, CO, or S. $R^7$ and $R^8$ each independently represent a hydrogen atom, a methyl group, or an ethyl group, or $R^7$ and $R^8$ represent a cyclohexylidene group formed by the $R^7$ and $R^8$ bonded to each other. Furthermore, m indicates the number of repetitions.)

It is preferable that the polyarylate resin of the invention should have the following repeating units.

[Chem. 10]

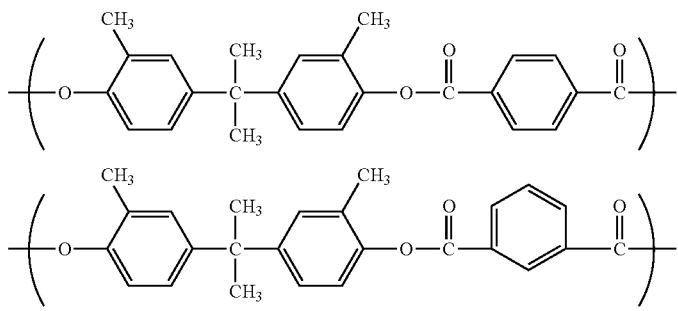

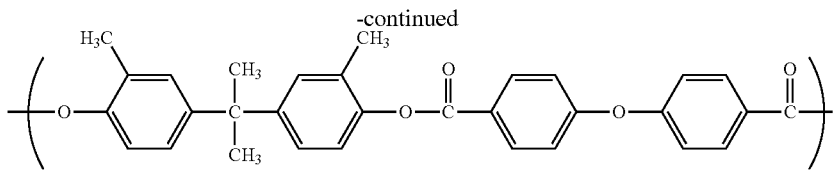

When the polyarylate resin of the invention is examined with a gas chromatograph, the amount of bisphenol residues represented by the following formula (3) which are detected by a hydrogen flame ionization method (FID), based on the total amount of bisphenol residues represented by formula (2) and formula (3), is as follows in terms of intensity ratio. The upper limit thereof is 1% or less, and is preferably 0.8% or less, more preferably 0.5% or less, from the standpoint of electrical properties during repeated use. The lower limit thereof is 0.2% or higher, and is preferably 0.3% or higher, more preferably 0.4% or higher. The amount of bisphenol residues in this case is the sum of the free bisphenols and the bisphenols bonded in the repeating units. It is thought that due to the presence of bisphenol residues of formula (3) in the polyarylate resin in an amount within the range shown above, not only compatibility between the polyarylate resin and the charge transport substance is heightened but also interaction with the charge generation substance also is enhanced, resulting in satisfactory electrical properties during repeated use. The amount of bisphenol residues represented by the following formula (3) in the polyarylate resin can be determined, for example, by hydrolyzing the polyarylate resin, which has a repeating structure represented by formula (1), under basic or acidic conditions to decompose the resin into monomer ingredients, neutralizing the mixture, and examining the mixture with a gas chromatograph. In a method for the hydrolysis, an alcohol such as methanol, ethanol, 1-propanol, 1-butanol, or benzyl alcohol or water is used as a solvent, and a base such as sodium hydroxide, potassium hydroxide, sodium methoxide, or sodium ethoxide is used for the basic conditions or an acid such as hydrochloric acid or sulfuric acid is used for the acidic conditions. The reaction temperature in the hydrolysis is preferably 20-100° C., more preferably 30-70° C. In case where the reaction temperature is too low, the rate of hydrolysis is too low to sufficiently decompose the resin into monomers. Meanwhile, too high reaction temperatures result in a possibility that bisphenol decomposition might occur undesirably. Completion of the hydrolysis reaction can be ascertained by GPC or NMR. Even in the case of a polyarylate resin which has been incorporated into a photosensitive layer, the amount of bisphenol residues can be ascertained by performing the same hydrolysis and analysis after the photosensitive layer is peeled off and the polyarylate resin is taken out using a solvent.

[Chem. 11]

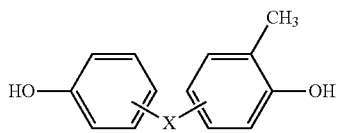

(3)

(In formula (3), X represents a single bond, $-CR^1R^2-$, O, CO, or S. $R^1$ and $R^2$ each independently represent a hydrogen atom, a methyl group, or an ethyl group, or $R^1$ and $R^2$ represent a cyclohexylidene group formed by the $R^1$ and $R^2$ bonded to each other.)

In an examination with a gas chromatograph, the content of bisphenols represented by the following formula (4) in the polyarylate resin which are detected by the hydrogen flame ionization method (FID), based on the total amount of bisphenol represented by formula (2), formula (3), and formula (4), is as follows in terms of intensity ratio. The upper limit thereof is preferably 15 ppm or less, more preferably 10 ppm or less, even more preferably 8 ppm or less, in particular 5 ppm or less, and it is especially preferable that no bisphenols represented by formula (4) should be detected. The amount of bisphenols represented by formula (4) is the sum of the free bisphenols and the bisphenols bonded in the repeating structures. It is thought that due to such reduced content of bisphenols of formula (4) in the polyarylate resin, not only terminal groups such as carbonyl chloride terminals can be controlled but also the mere decrease in phenol ingredient content is effective in inhibiting charge accumulation, resulting in satisfactory unsusceptibility to transfer memory during repetitions. The content of bisphenol residues represented by the following formula (4) in the polyarylate resin can be determined, for example, by hydrolyzing the polyarylate resin, which has a repeating structure represented by formula (1), under basic or acidic conditions to decompose the resin into monomer ingredients, neutralizing the mixture, and examining the mixture with a gas chromatograph. The proportion of the area of each peak in the total area of the peaks assigned to respective starting-material monomers is taken as the content.

[Chem. 12]

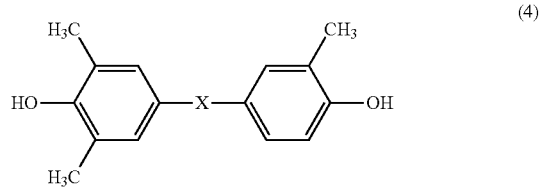

(4)

(In formula (4), X represents a single bond, $-CR^3R^4-$, O, CO, or S. $R^3$ and $R^4$ each independently represent a hydrogen atom, a methyl group, or an ethyl group, or $R^3$ and $R^4$ represent a cyclohexylidene group formed by the $R^3$ and $R^4$ bonded to each other.)

<Starting-material Monomers>

For producing the polyarylate resin of the invention, starting-material monomers including a bisphenol having a structure represented by formula (2) are used.

[Chem. 13]

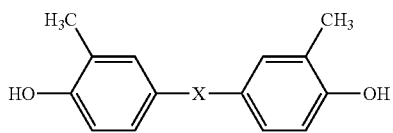

(In formula (2), X represents a single bond, —CR$^1$R$^2$—, O, CO, or S. R$^1$ and R$^2$ each independently represent a hydrogen atom, a methyl group, or an ethyl group, or R$^1$ and R$^2$ represent a cyclohexylidene group formed by the R$^1$ and R$^2$ bonded to each other.)

Specific examples of the structure of the bisphenol represented by formula (2) are shown below.

[Chem. 14]

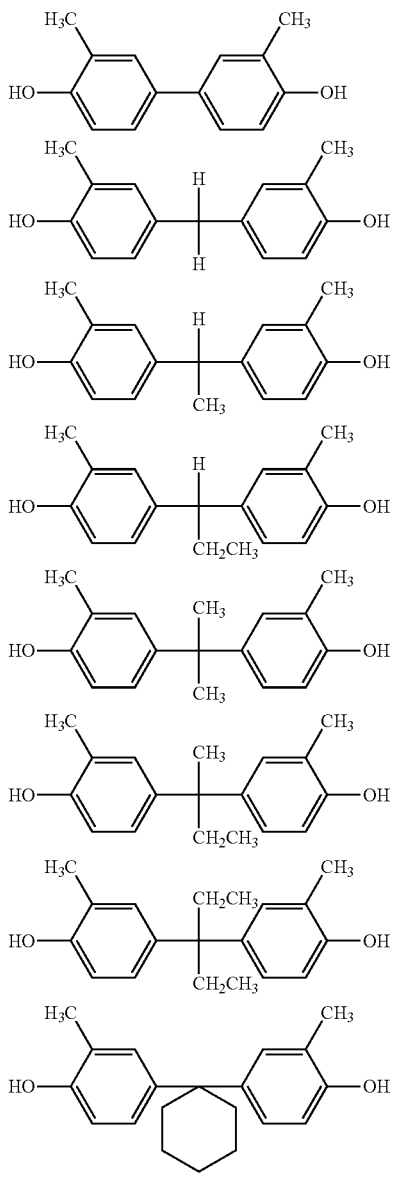

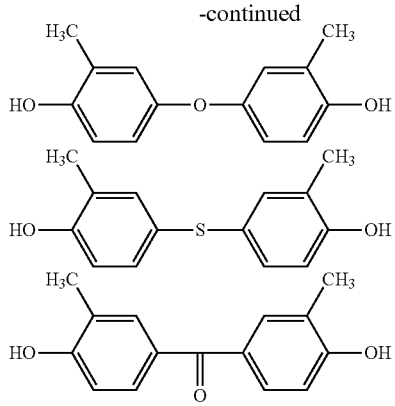

Preferred examples among these include bis(4-hydroxy-3-methylphenyl)methane, 1,1-bis(4-hydroxy-3-methylphenyl)ethane, 2,2-bis(4-hydroxy-3-methylphenyl)propane, and 2,2-bis(4-hydroxy-3-methylphenyl)butane. More preferred from the standpoint of electrical property are 1,1-bis(4-hydroxy-3-methylphenyl)ethane and 2,2-bis(4-hydroxy-3-methylphenyl)propane.

In the starting-material monomers, the purity of the bisphenol represented by formula (2) is usually 99% or higher, preferably 99.2% or higher, more preferably 99.4% or higher. In cases when the purity thereof is not less than the lower limit, molecular-weight control in producing the polymer (polyarylate resin) can be effectively performed. The upper limit thereof is usually 99.8% or less, preferably 99.7% or less, more preferably 99.6% or less. In case where the purity thereof exceeds the upper limit, the content of bisphenols of a structure represented by the following formula (3) becomes too low to obtain electrical properties during repeated use. The purity can be determined with a gas chromatograph. The proportion of the area of each peak in the total area of the peaks assigned to respective starting-material monomers is taken as the content.

Incidentally, the starting-material monomers may include only one bisphenol of a structure represented by formula (2), or may include any desired combination of two or more bisphenols having different structures represented by formula (2), in any desired proportion.

In the invention, the content of bisphenols represented by the following formula (3) in the starting-material monomers, which are detected by a hydrogen flame ionization method (FID) in an examination with a gas chromatograph, is as follows in terms of intensity ratio. The upper limit thereof is 1% or less, and is preferably 0.8% or less, more preferably 0.5% or less, from the standpoint of mechanical property. The lower limit thereof is 0.2% or higher, preferably 0.3% or higher, more preferably 0.4% or higher. When the content of bisphenols represented by the following formula (3) exceeds 1%, there are cases where the polyarylate produced by polymerizing the starting-material monomers has impaired mechanical properties or impaired solubility. Meanwhile, when the content thereof is less than 0.2%, there are cases where the polyarylate resin produced has impaired electrical properties, in particular, impaired electrical properties during repeated use. It is thought that since the bisphenols represented by formula (3) are lower in the content of ortho-position methyl groups than the bisphenols represented by formula (2) and hence show high reactivity during polymerization, the bisphenols represented by formula (3) are effective in controlling the terminal groups of the polyarylate to be produced, rendering the solubility and the electrical properties satisfactory. The content of bisphenols represented by the following formula (3) in the starting-material monomers can be determined with a gas chromatograph. The proportion of the area of each peak in the total area of the peaks assigned to respective starting-material monomers is taken as the content.

[Chem. 15]

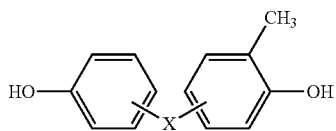
(3)

(In formula (3), X represents a single bond, —$CR^1R^2$—, O, CO, or S. $R^1$ and $R^2$ each independently represent a hydrogen atom, a methyl group, or an ethyl group, or $R^1$ and $R^2$ represent a cyclohexylidene group formed by the $R^1$ and $R^2$ bonded to each other.)

Preferred of the bisphenols of formula (3) are bisphenols represented by formula (3a), from the standpoint of polymerizability.

[Chem. 16]

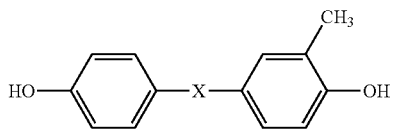
(3a)

(In formula (3a), X represents a single bond, —$CR^1R^2$—, O, CO, or S. $R^1$ and $R^2$ each independently represent a hydrogen atom, a methyl group, or an ethyl group, or R' and $R^2$ represent a cyclohexylidene group formed by the $R^1$ and $R^2$ bonded to each other.)

Specific examples of the structures of the bisphenols represented by formula (3) are shown below.

[Chem. 17]

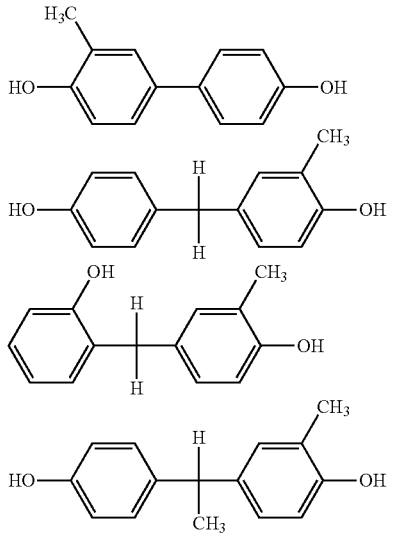

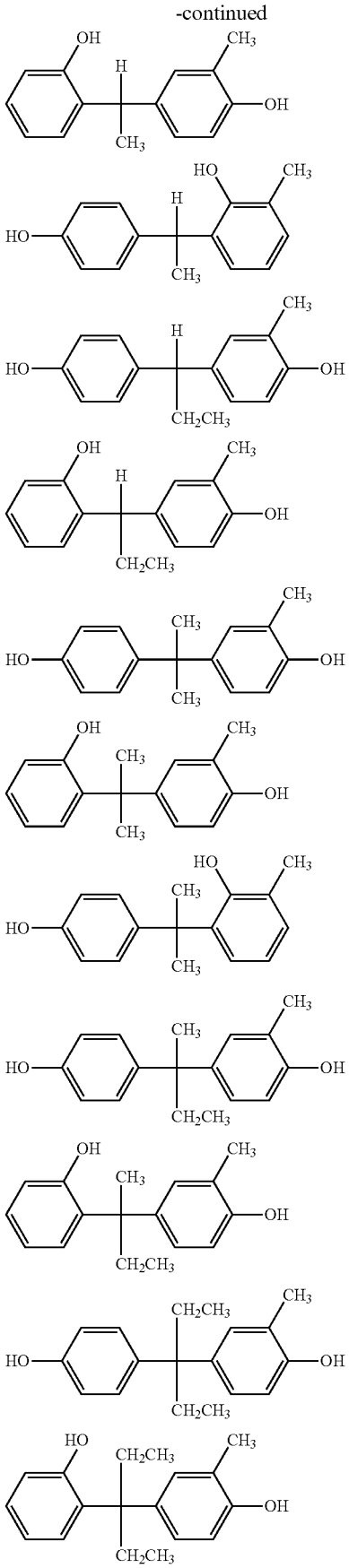

-continued

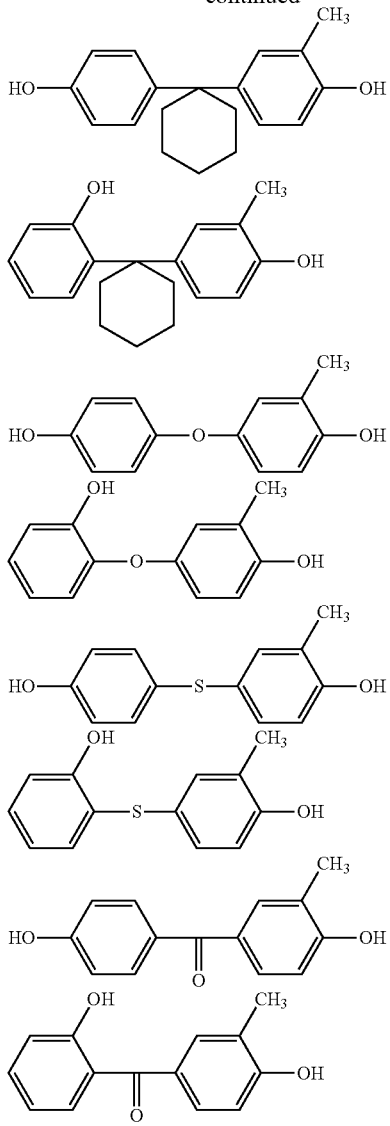

Examples among these include
(4-hydroxyphenyl)(4-hydroxy-3-methylphenyl)methane,
(2-hydroxyphenyl)(4-hydroxy-3-methylphenyl)methane,
1,1-(4-hydroxyphenyl)(4-hydroxy-3-methylphenyl)ethane,
1,1-(2-hydroxyphenyl)(4-hydroxy-3-methylphenyl)ethane,
1,1-(4-hydroxyphenyl)(2-hydroxy-3-methylphenyl)ethane,
2,2-(4-hydroxyphenyl)(4-hydroxy-3-methylphenyl)propane,
2,2-(2-hydroxyphenyl)(4-hydroxy-3-methylphenyl)propane, and
2,2-(4-hydroxyphenyl)(2-hydroxy-3-methylphenyl)propane.

Especially preferred are 1,1-(4-hydroxyphenyl)(4-hydroxy-3-methylphenyl)ethane and 2,2-(4-hydroxyphenyl)(4-hydroxy-3-methylphenyl)propane.

The content of bisphenols represented by the following formula (4) in the starting-material monomers, which are detected by a hydrogen flame ionization method (FID) in an examination with a gas chromatograph, is preferably 15 ppm or less in terms of intensity ratio. From the standpoint of electrical property, the content thereof is more preferably 10 ppm or less, even more preferably 5 ppm or less, especially preferably 1 ppm or less. In cases when the content of bisphenols represented by the following formula (4) is 15 ppm or less, the polyarylate produced by polymerizing the starting-material monomers has satisfactory electrical properties and polymerization control is satisfactory. It is thought that since the bisphenols represented by the following formula (4) have a larger amount of ortho-position methyl groups and hence show low reactivity during polymerization, polymerization repeatability is attained by regulating the content thereof to 15 ppm or less and it becomes easy to control the terminal groups of the polyarylate to be produced, rendering the electrical properties satisfactory. The content of bisphenols represented by the following formula (4) in the starting-material monomers can be determined with a gas chromatograph.

[Chem. 18]

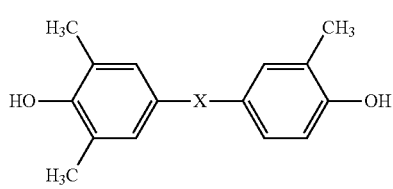

(In formula (4), X represents a single bond, $-CR^3R^4-$, O, CO, or S. $R^3$ and $R^4$ each independently represent a hydrogen atom, a methyl group, or an ethyl group, or $R^3$ and $R^4$ represent a cyclohexylidene group formed by the $R^3$ and $R^4$ bonded to each other.)

Specific examples of the structures of the bisphenols represented by formula (4) are shown below.

[Chem. 19]

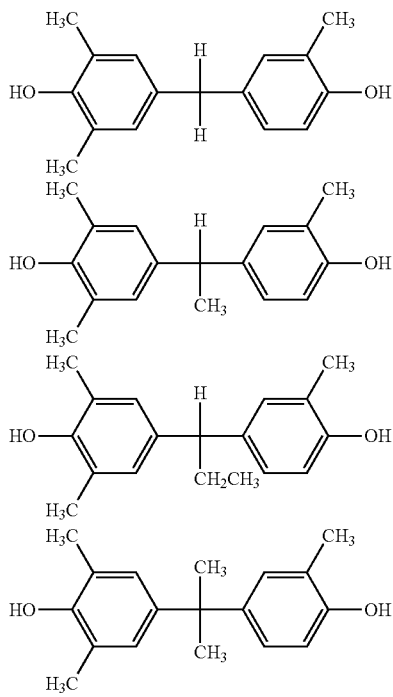

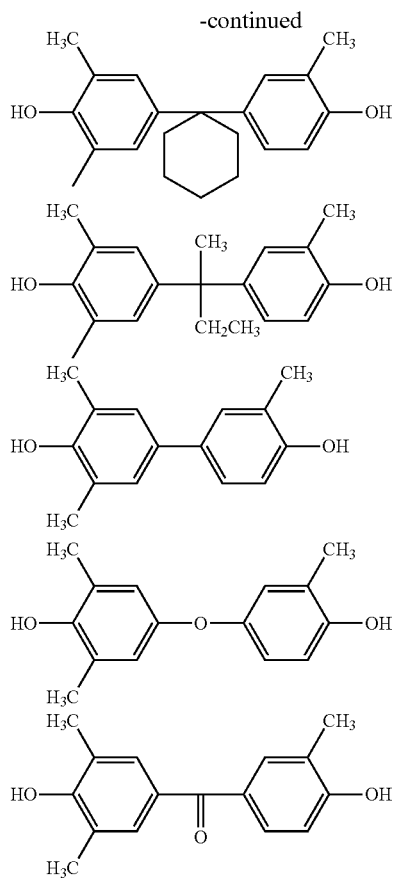
-continued

The starting-material monomers to be used in the invention usually contain impurities (e.g., phenol, 2,6-xylenol, toluene, xylene, etc.) which were contained in the orthocresol used as a starting material therefor, and further contain by-products derived from these impurities, positional isomers attributable to the dimerization reaction of the orthocresol, etc.

In the invention, by controlling the amount of phenol-derived by-products among those impurities in the starting-material monomers, a polyarylate resin having excellent properties is obtained. Incidentally, the amount of the phenol-derived by-products (bisphenols represented by formula (3)) can be controlled, for example, by controlling the production (purification) of the orthocresol to be used for producing a bisphenol represented by formula (2) or by a method in which an appropriate amount of phenol is added to the purified orthocresol.

Preferred from the standpoint of controlling the content of 2,6-xylenol are: a method in which orthocresol is obtained by rectification from a cresol mixture synthesized by hydrolyzing chlorobenzene as a starting material; and a method in which purified orthochlorotoluene is hydrolyzed to thereby produce orthocresol. As compared with the case of using a fractionated cresol, the case where chlorobenzene is used as a starting material is effective in impurity elimination because the chlorobenzene itself used as a starting material contains no xylenol impurity.

<Process for Producing the Polyarylate Resin>

Processes for producing the polyarylate resin of the invention are not particularly limited so long as starting-material monomers including a bisphenol represented by formula (2) described later can be polymerized thereby, and known polymerization methods for polyarylate production can be used to produce the polyarylate resin of the invention. As polymerization methods for producing the polyarylate resin, use can be made, for example, of an interfacial polymerization method, melt polymerization method, solution polymerization method, and the like. Here, one example of processes for producing the polyarylate resin is explained.

In the case of production by an interfacial polymerization method, the procedure is, for example, as follows. A solution prepared by dissolving a divalent phenol compound in an aqueous alkali solution is mixed with a solution in a halogenated hydrocarbon of an aromatic dicarbonyl chloride compound. In this case, a quaternary ammonium salt or a quaternary phosphonium salt can be caused to be present as a catalyst. It is preferable from the standpoint of production efficiency that the polymerization temperature should be in the range of 0-40° C. and the polymerization period be in the range of 2-20 hours. After completion of the polymerization, the aqueous phase is separated from the organic phase, and the polymer dissolved in the organic phase is washed and recovered by a known method. Thus, the desired resin is obtained.

Examples of the alkali ingredient to be used in the interfacial polymerization method include the hydroxides of alkali metals, such as sodium hydroxide and potassium hydroxide. It is preferable that the amount of the alkali ingredient to be used should be in the range of 1.01-3 equivalents to the phenolic hydroxy groups contained in the reaction system.

Examples of the halogenated hydrocarbon include dichloromethane, chloroform, 1,2-dichloroethane, trichloroethane, tetrachloroethane, chlorobenzene, and dichlorobenzene.

Examples of the quaternary ammonium salt or quaternary phosphonium salt to be used as a catalyst include: salts of tertiary alkylamines, such as tributylamine and trioctylamine, with hydrochloric acid, bromic acid, iodic acid, or the like; and benzyltriethylammonium chloride, benzyltrimethylammonium chloride, benzyltributylammonium chloride, tetraethylammonium chloride, tetrabutylammonium chloride, tetrabutylammonium bromide, trioctylmethylammonium chloride, tetrabutylphosphonium bromide, triethyloctadecylphosphonium bromide, N-laurylpyridinium chloride, and laurylpicolinium chloride.

In the interfacial polymerization method, a molecular weight regulator can be used. Examples of the molecular weight regulator include: phenol and alkylphenols such as o-cresol, m-cresol, p-cresol, o-ethylphenol, m-ethylphenol, p-ethylphenol, o-propylphenol, m-propylphenol, p-propylphenol, o-(tert-butyl)phenol, m-(tert-butyl)phenol, p-(tert-butyl)phenol, pentylphenol, hexylphenol, octylphenol, nonylphenol, 2,6-dimethylphenol derivatives, and 2-methylphenol derivatives; monofunctional phenols such as o-phenylphenol, m-phenylphenol, and p-phenylphenol; and monofunctional acid halides such as acetyl chloride, butyryl chloride, octylyl chloride, benzoyl chloride, benzenesulfonyl chloride, benzenesulfinyl chloride, sulfinyl chlorides, benzenesulfonyl chloride, and substituted forms thereof. Preferred of these molecular weight regulators, from the standpoints of the high ability to regulate molecular weight and solution stability, are o-(tert-butyl)phenol, m-(tert-butyl)phenol, p-(tert-butyl)phenol, 2,6-dimethylphenol derivatives, and 2-methylphenol derivatives. Especially preferred are p-(tert-butyl)phenol, 2,3,6-trimethylphenol, and 2,3,5-trimethylphenol.

Furthermore, an antioxidant can be added in order to prevent the divalent phenol(s) from oxidizing in the alkali solution. Examples of the antioxidant include sodium sulfite, hydrosulfite (sodium hydrosulfite), sulfur dioxide, potassium sulfite, and sodium hydrogen sulfite. Especially preferred of these is hydrosulfite, from the standpoints of the effect of oxidation prevention and a reduction in environmental burden. The amount of the antioxidant to be used is preferably 0.01-10.0% by mass based on all the divalent phenols, and is more preferably 0.1-5% by mass. In case where the content thereof is too small, there is a possibility that the effect of oxidation prevention is insufficient. Too large amounts thereof may result in cases where the antioxidant undesirably remains in the polyarylate to adversely affect the electrical properties.

For purifying the polyarylate resin produced by the polymerization, any desired method can be used so long as the effects of the invention are considerably lessened thereby. Examples thereof include a method in which the solution of the polyarylate resin is washed with an aqueous solution of an alkali, e.g., sodium hydroxide or potassium hydroxide, or an aqueous solution of an acid, e.g., hydrochloric acid, nitric acid, or phosphoric acid, or with water, etc., and the solution is then subjected to liquid separation by still standing, centrifugal separation, etc.

With respect to other purification methods, the polyarylate resin may be purified, for example, by: a method in which the polyarylate resin solution yielded is caused to undergo precipitation in a solvent in which the polyarylate resin is insoluble; a method in which the polyarylate resin solution is dispersed in warm water and the solvent is distilled off; or a method in which the polyarylate resin solution is passed through an adsorption column or the like.

The polyarylate resin thus purified may be taken out by precipitating the polyarylate resin in a liquid in which the resin is insoluble, such as water, an alcohol, or another organic solvent, or by distilling off the solvent from the polyarylate resin solution in either warm water or a dispersion medium in which the polyarylate resin is insoluble, or by distilling off the solvent by heating, pressure reduction, etc. In the case where the polyarylate resin taken out is in a slurry state, the solid can be taken out with a centrifugal separator, filter, or the like.

The polyarylate resin obtained is usually dried at a temperature not higher than the decomposition temperature of the polyarylate resin. Preferably, however, the resin can be dried at a temperature of 20° C. or higher but not higher than the melting temperature of the resin. It is preferred to conduct this drying under vacuum.

With respect to drying period, it is preferred to perform the drying at least for a period in which the purity of impurities including the residual solvent decreases to or below a certain value. Specifically, the drying is conducted at least for a period in which the content of the residual solvent decreases to usually 1,000 ppm or less, preferably 300 ppm or less, more preferably 100 ppm or less.

<Properties of the Polyarylate Resin>

The viscosity-average molecular weight (Mv) of the polyarylate resin of the invention is usually 5,000 or higher, preferably 10,000 or higher, more preferably 20,000 or higher, and is usually 200,000 or less, preferably 150,000 or less, more preferably 100,000 or less. When the viscosity-average molecular weight (Mv) thereof is less than 5,000, there are cases where the mechanical strength thereof is insufficient, rendering the resin impracticable. When the viscosity-average molecular weight thereof exceeds 200,000, there are cases where a coating fluid thereof must be made to have a reduced solid content in order to impart a proper viscosity thereof, making it difficult to apply the coating fluid in an appropriate even film thickness.

The amount of carbonyl chloride groups present at the terminals of the polyarylate resin according to the invention is usually 0.1 µeq/g or less, preferably 0.05 µeq/g or less. In case where the amount of the terminal carbonyl chloride groups exceeds the range, this polyarylate resin tends to give a coating fluid for electrophotographic photoreceptors which has reduced storage stability.

The amount of OH groups present at the terminals of the polyarylate resin according to the invention is usually 50 µeq/g or less, preferably 25 µeq/g or less. In case where the amount of the terminal OH groups exceeds the range, an electrophotographic photoreceptor produced using this polyarylate resin tends to have impaired electrical properties.

<<2. Electrophotographic Photoreceptor>>

An electrophotographic photoreceptor to which this embodiment is applied is a multilayer type photoreceptor that includes a conductive support and, disposed thereover, a laminate layer at least including: a charge generation layer containing a charge generation substance as a main component; and a charge transport layer including a charge transport substance and a binder resin as main components. The polyarylate resin described above, which has a repeating structure represented by formula (1), is used in the charge transport layer.

<Conductive Support>

The conductive support is not particularly limited. Mainly used as the conductive support is, for example, a metallic material such as aluminum, an aluminum alloy, stainless steel, copper, or nickel, a resinous material to which electrical conductivity has been imparted by adding a conductive powder, e.g., a metal, carbon, or tin oxide powder, or a resin, glass, paper, or the like, the surface of which has been coated with a conductive material, e.g., aluminum, nickel, or ITO (indium oxide/tin oxide), by vapor deposition or coating fluid application. One of these may be used alone, or any desired combination of two or more thereof may be used in any desired proportion. With respect to the form of conductive support, the conductive support may be in the form of a drum, sheet, belt, or the like. Furthermore, use may be made of a conductive support which is made of a metallic material and which has been coated with a conductive material having an appropriate resistance value for the purposes of controlling conductivity, surface properties, etc. and of covering defects.

In the case where a metallic material such as an aluminum alloy is used as a conductive support, this material may be used after an anodized coating film is formed thereon. In the case where an anodized coating film has been formed, it is desirable to subject the material to a pore-filling treatment by a known method.

The surface of the support may be smooth, or may have been roughened by using a special machining method or by performing a grinding treatment. Alternatively, use may be made of a support having a roughened surface obtained by incorporating particles with an appropriate particle diameter into the material for constituting the support. Furthermore, a drawn pipe can be used as such without subjecting the pipe to machining, for the purpose of cost reduction.

<Undercoat Layer>

An undercoat layer may be disposed between the conductive support and the photosensitive layer, which will be described later, in order to improve adhesiveness, nonblocking properties, etc. As the undercoat layer, use may be made, for example, of a resin or a resin in which particles of a metal oxide or the like have been dispersed. The undercoat layer may be constituted of a single layer, or may be composed of a plurality of layers. In the case where the undercoat layer is composed of a plurality of layers, this undercoat layer may have a configuration including a conductive layer (interference fringe prevention layer) disposed on the conductive support and an interlayer.

Examples of the metal oxide particles for use in the undercoat layer include particles of a metal oxide containing one metallic element, such as titanium oxide, indium oxide, tin oxide, aluminum oxide, silicon oxide, zirconium oxide, zinc oxide, iron oxide, or barium oxide, and particles of a metal oxide containing a plurality of metallic elements, such as calcium titanate, strontium titanate, or barium titanate. Particles of one kind selected from these may be used alone, or particles of two or more kinds may be mixed together and used. Preferred of those particulate metal oxides are titanium oxide and aluminum oxide. Especially preferred is titanium oxide. The titanium oxide particles may be ones, the surface of which has been treated with an inorganic substance such as tin oxide, aluminum oxide, antimony oxide, zirconium oxide, or silicon oxide or with an organic substance such as stearic acid, a polyol, or a siloxane. With respect to the crystal form of the titanium oxide particles, any of rutile, anatase, brookite, and amorphous ones is usable. Furthermore, the titanium oxide particles may include particles in a plurality of crystal states.

Metal oxide particles having various particle diameters can be utilized. However, from the standpoints of property and the stability of fluid, the metal oxide particles to be used have an average primary-particle diameter of preferably 10-100 nm, especially preferably 10-50 nm. The average primary-particle diameter can be obtained from a TEM photograph, etc.

It is desirable that the undercoat layer should be formed so as to be configured of a binder resin and metal oxide particles dispersed therein. Examples of the binder resin to be used in the undercoat layer include known binder resins such as epoxy resins, polyethylene resins, polypropylene resins, acrylic resins, methacrylic resins, polyamide resins, vinyl chloride resins, vinyl acetate resins, phenolic resins, polycarbonate resins, polyurethane resins, polyimide resins, vinylidene chloride resins, poly(vinyl acetal) resins, vinyl chloride/vinyl acetate copolymers, poly(vinyl alcohol) resins, polyurethane resins, polyacrylic resins, polyacrylamide resins, polyvinylpyrrolidone resins, polyvinylpyridine resins, water-soluble polyester resins, cellulose ester resins such as nitrocellulose, cellulose ether resins, casein, gelatin, poly(glutamic acid), starch, starch acetate, aminostarch, organozirconium compounds such as zirconium chelate compounds and zirconium alkoxide compounds, organic titanyl compounds such as titanyl chelate compounds and titanium alkoxide compounds, and silane coupling agents. One of these resins may be used alone, or any desired combination of two or more thereof may be used in any desired proportion. The binder resin may be used together with a hardener to come into a hardened state. Resol type phenolic resins, alcohol-soluble copolyamides, modified polyamides, and the like are preferred of those because these resins show satisfactory dispersibility and applicability.

The proportion of the inorganic particles to be used, to the binder resin to be used in the undercoat layer, can be selected at will. However, from the standpoint of the stability and applicability of the dispersion, it is usually preferred to use the inorganic particles in an amount in the range of 10-500% by mass based on the binder resin.

The thickness of the undercoat layer is not limited unless the effects of the invention are considerably lessened thereby. However, from the standpoints of improving the electrical properties, stability to intense exposure, image characteristics, and repeatability of the electrophotographic photoreceptor and improving the applicability during production, the thickness thereof is usually 0.01 μm or larger, preferably 0.1 μM or larger, and is usually 30 JAM or less, preferably 20 μm or less. A known antioxidant and the like may be incorporated into the undercoat layer. Pigment particles, resin particles, and the like may be incorporated into the layer to be used, for the purpose of, for example, preventing image defects.

<Charge Generation Layer>

The charge generation layer is formed by binding a charge generation substance with a binder resin. Fine particles of a pigment are used in the form of a dispersion layer in which the fine particles have been bound with any of various binder resins.

Examples of the charge generation substance include metal-free phthalocyanines and phthalocyanine compounds to which a metal, e.g., copper, indium, tin, titanium, gallium, zinc, vanadium, silicon, germanium, or aluminum, or an oxide, halide, hydroxide, alkoxide, or another form of the metal has coordinated, these phthalocyanines and phthalocyanine compounds having respective crystal forms, and further include phthalocyanine dimers in which oxygen or other atoms are used as crosslinking atoms. Especially suitable are X-form and τ-form metal-free phthalocyanines, which are crystal forms having high sensitivity, A-form (also called β-form), B-form (also called α-form), D-form (also called Y-form), and other titanyl phthalocyanines (other name: oxytitanium phthalocyanines), vanadyl phthalocyanines, chloroindium phthalocyanines, hydroxyindium phthalocyanines, II-form and other chlorogallium phthalocyanines, G-form, I-form, and other μ-oxogallium phthalocyanine dimers, and II-from and other μ-oxoaluminum phthalocyanine dimers.

Of these, hydroxygallium phthalocyanines having crystal forms which enable high sensitivity are suitable for use. More preferred of these are: the V-form hydroxygallium phthalocyanine described in patent document 8; hydroxygallium phthalocyanine having a most intense peak at 28.1° or hydroxygallium phthalocyanine characterized by having no peak at 26.2°, having a distinct peak at 28.1°, and having a half-value width W at 25.9° of $0.1°≤W≤0.4°$, these phthalocyanines being described in patent document 9; and G-form μ-oxogallium phthalocyanine dimer and the like. Especially preferred of these are the V-form hydroxygallium phthalocyanine and the hydroxygallium phthalocyanine having a most intense peak at 28.1°.

The V-form hydroxygallium phthalocyanine pigment can be produced by a known method. For example, crude gallium phthalocyanine is produced by a method in which o-phthalodinitrile or 1,3-diiminoisoindoline is reacted with gallium trichloride in a given solvent (I-form chlorogallium phthalocyanine method), a method in which o-phthalodinitrile, an alkoxygallium, and ethylene glycol are heated and reacted in a given solvent to synthesize a phthalocyanine dimer (phthalocyanine dimer method), or the like. As the solvents in the reactions, it is preferred to use a solvent which is inert and has a high boiling point, such as α-chloronaphthalene, β-chloronaphthalene, α-methylnaphthalene, methoxynaphthalene, dimethylaminoethanol, diphenylmethane, diphenylethane, ethylene glycol, dialkyl ethers, quinoline, sulfolane, dichlorobenzene, dimethylformamide, dimethyl sulfoxide, or dimethylsulfamide.

From the standpoint of electrical property, it is preferred to use the non-halogen solvents among these. More preferred of these are quinoline, sulfolane, dimethylformamide, and dimethyl sulfoxide. Especially preferred is dimethyl sulfoxide.

Next, the crude gallium phthalocyanine obtained in the step described above is further subjected to an acid pasting treatment to thereby finely pulverize the crude gallium phthalocyanine and simultaneously convert the crude gallium phthalocyanine into an I-form hydroxygallium phthalocyanine pigment. The acid pasting treatment according to the invention specifically is a treatment in which either a solution prepared by dissolving the crude gallium phthalocyanine in an acid, such as sulfuric acid, or an acid salt thereof, such as the sulfuric acid salt, is poured into an aqueous alkali solution, water, or ice water to recrystallize the phthalocyanine. The acid to be used in the acid pasting treatment preferably is sulfuric acid. More preferred is sulfuric acid having a concentration of 70-100% (especially preferably 95-100%).

After the acid pasting treatment, the I-form hydroxygallium phthalocyanine pigment obtained is subjected to a milling treatment together with a solvent. Thus, a V-form hydroxygallium phthalocyanine pigment which, in an examination with CuKα characteristic X-ray, gives an X-ray diffraction pattern having intense diffraction peaks at Bragg angles) (2θ±0.2° of 7.5°, 9.9°, 12.5°, 16.3°, 18.6°, 25.1°, and 28.3° can be obtained. Alternatively, after the acid pasting treatment, the resultant pigment is freeze-dried and the lowly crystalline hydroxygallium phthalocyanine pigment obtained is subjected to a milling treatment together with a solvent. Thus, hydroxygallium phthalocyanine which, in an examination with CuKα characteristic X-ray, gives an X-ray diffraction pattern having a maximum peak at a Bragg angle (2θ±0.2° of 28.1°) can be obtained.

The milling treatment herein is a treatment performed using a milling device, such as a sand mill or a ball mill, together with a dispersing medium such as, for example, glass beads, steel beads, or alumina balls. The period of the milling treatment cannot be unconditionally specified since the period varies depending on the milling device to be used. However, the period thereof is preferably about 4-48 hours. The pigment may be sampled at intervals of 1-3 hours and examined for Bragg angle. The amount of the dispersing agent to be used in the milling treatment is preferably 10-50 times by weight the amount of the lowly crystalline hydroxygallium phthalocyanine.

Incidentally, in the case where the hydroxygallium phthalocyanine obtained by synthesizing chlorogallium phthalocyanine in a known manner by the I-form chlorogallium phthalocyanine method and hydrolyzing this chlorogallium phthalocyanine by the acid pasting is used as a charge generation material, the electrophotographic properties are considerably affected by the method used for synthesizing the chlorogallium phthalocyanine, in particular, by the kind of the organic solvent used. Namely, even when the hydroxygallium phthalocyanine obtained has the same crystal form, use thereof in an electrophotographic photoreceptor results in differences in electrical property and image characteristics. The reason for this is thought to be as follows. Even in the case of the same crystal form, by-products and impurities show different solubility in the different reaction solvents. As a result, the amount of these substances which are incorporated into and remain in the chlorogallium phthalocyanine crystals differs. Meanwhile, in the case where reaction solvents themselves have been incorporated into the chlorogallium phthalocyanine crystals, the degree of the influences thereof differs depending to the kinds of the reaction solvents. In addition, even in the later step in which the chlorogallium phthalocyanine is converted to hydroxygallium phthalocyanine through the acid pasting treatment and the milling treatment, the residual substances and reaction solvent are not completely removed and partly remain.

In the case where the hydroxygallium phthalocyanine is used in a charge generation layer, the residual substances and residual reaction solvent in the hydroxygallium phthalocyanine exert influences to different degrees depending also on the kind of the charge transport layer laminated thereon. The influences thereof are remarkable especially when the hydroxygallium phthalocyanine is used in combination with a charge transport layer in which the polyarylate resin to be used in the invention is used. Although the cause thereof is unknown, the polyarylate resin of the invention has high polarity as compared with, for example, polycarbonate resins or the like and the polar groups thereof are apt to function as traps for charge movement and tend to lower the charge mobility. The polyarylate resin hence interacts with the impurities or residual solvent contained in the hydroxygallium phthalocyanine and thereby forms deeper traps in the vicinity of the boundary, resulting in the remarkable influences.

With respect to the residual solvent contained in the hydroxygallium phthalocyanine, it is preferable from the standpoint of the durability of electrical properties that the content of α-chloronaphthalene, in terms of content per unit area of the charge generation layer, is preferably 0.2 ng/cm$^2$ or less, more preferably 0.1 ng/cm$^2$ or less, especially preferably nil.

A residual solvent contained in the hydroxygallium phthalocyanine can be determined also from the electrophotographic photoreceptor. The procedure for the determination is as follows. First, the overlying layers including the charge transport layer are removed, for example, with an organic solvent. Subsequently, the charge generation layer component (corresponding to 100 cm$^2$) is separated, and the binder resin therein is dissolved away in a solvent to isolate the hydroxygallium phthalocyanine pigment. Thereafter, the pigment specimen isolated is subjected to the identification and quantification of components thereof by the GC/MS (SIM) method. In the quantification, a calibration curve (peak area vs. detection intensity) is first drawn using reaction solvent (e.g., α-chloronaphthalene) references having known concentrations, and the amount of the solvent detected is calculated from the calibration curve and the peak area of the test sample. Furthermore, references are added before the test sample is isolated, and the degree of recovery is ascertained. The amount of the solvent detected is corrected using the recovery.

The hydroxygallium phthalocyanine pigment may be used as a mixture thereof with one or more known azo pigments. In this case, it is more preferred to use a disazo pigment and a trisazo pigment in combination so that the charge generation layer has spectral sensitivity in different spectral regions, i.e., the visible region and the near infrared region.

The binder resin to be used in the charge generation layer is not particularly limited. Examples thereof include insulating resins such as poly(vinyl acetal)-based resins, e.g., poly(vinyl butyral) resins, poly(vinyl formal) resins, and partly acetalized poly(vinyl butyral) resins in which the butyral moieties have been modified with formal, acetal, or the like, polyarylate resins, polycarbonate resins, polyester resins, modified ether-based polyester resins, phenoxy resins, poly(vinyl chloride) resins, poly(vinylidene chloride) resins, poly(vinyl acetate) resins, polystyrene resins, acrylic resins, methacrylic resins, polyacrylamide resins, polyamide resins, polyvinylpyridine resins, cellulosic resins, polyurethane resins, epoxy resins, silicone resins, poly(vinyl alcohol) resins, polyvinylpyrrolidone resins, casein, copolymers based on vinyl chloride and vinyl acetate, e.g., vinyl chloride/vinyl acetate copolymers, hydroxy-modified vinyl chloride/vinyl acetate copolymers, carboxyl-modified vinyl chloride/vinyl acetate copolymers, and vinyl chloride/vinyl acetate/maleic anhydride copolymers, styrene/butadiene copolymers, vinylidene chloride/acrylonitrile copolymers, styrene/alkyd resins, silicone/alkyd resins, and phenol/formaldehyde resins, and organic photoconductive polymers such as poly(N-vinylcarbazole), polyvinylanthracene, and polyvinylperylene. Any one of these binder resins may be used alone, or any desired combination of two or more thereof may be used as a mixture thereof.

Solvents usable for producing the coating fluid are not particularly limited so long as the binder resin dissolves therein. Examples thereof include saturated aliphatic solvents such as pentane, hexane, octane, and nonane, aromatic solvents such as toluene, xylene, and anisole, halogenated aromatic solvents such as chlorobenzene, dichlorobenzene, and chloronaphthalene, amide solvents such as dimethylformamide and N-emthyl-2-pyrrolidone, alcohol solvents such as methanol, ethanol, isopropanol, n-butanol, and benzyl alcohol, aliphatic polyhydric alcohols such as glycerin and polyethylene glycol, chain or cyclic ketone solvents such as acetone, cyclohexanone, and methyl ethyl ketone, ester solvents such as methyl formate, ethyl acetate, and n-butyl acetate, halogenated hydrocarbon solvents such as methylene chloride, chloroform, and 1,2-dichloroethane, chain or cyclic ether solvents such as diethyl ether, dimethoxyethane, tetrahydrofuran, 1,4-dioxane, methyl Cellosolve, and ethyl Cellosolve, aprotic polar solvents such as acetonitrile, dimethyl sulfoxide, sulfolane, and hexamethylphosphoric triamide, nitrogen-containing compounds such as n-butylamine, isopropanolamine, diethylamine, triethanolamine, ethylenediamine, triethylenediamine, and triethylamine, mineral oils such as ligroin, and water. Any one of these may be used alone, or two or more thereof may be used in combination. In the case where the undercoat layer described above is disposed, solvents in which the undercoat layer does not dissolve are preferred.

In the charge generation layer, the ratio (mass) between the binder resin and the charge generation substance is as follows. The amount of the charge generation substance per 100 parts by mass of the binder resin is usually 10 parts by mass or larger, preferably 30 parts by mass or larger, and is usually 1,000 parts by mass or less, preferably 500 parts by mass or less. The thickness thereof is usually 0.1 μm or larger, preferably 0.15 μm or larger, and is usually 10 μm or less, preferably 0.6 μm or less. In case where the proportion of the charge generation substance is too high, there is a possibility that the coating fluid might have reduced stability due to agglomeration of the charge generation substance, etc. Meanwhile, in case where the proportion of the charge generation substance is too low, there is a possibility that the photoreceptor might have reduced sensitivity.

For dispersing the charge generation substance, a known dispersion method can be used, such as a ball-mill dispersion method, attritor dispersion method, or sand-mill dispersion method. In this case, it is effective to finely pulverize the particles to a particle size in the range of 0.5 μm or less, preferably 0.3 μm or less, more preferably 0.15 μm or less.

<Charge Transport Layer>

The charge transport layer includes a charge transport substance and a binder resin and may contain other ingredients according to need. This charge transport layer can be obtained usually by dissolving or dispersing a charge transport substance, etc. and a binder resin in a solvent to produce a coating fluid, applying the coating fluid to the charge generation layer, and drying the coating fluid applied.

The charge transport substance is not particularly limited, and any desired substance can be used. Examples of the charge transport substance include heterocyclic compounds such as carbazole derivatives, indole derivatives, imidazole derivatives, oxazole derivatives, pyrazole derivatives, thiadiazole derivatives, and benzofuran derivatives, aniline derivatives, hydrazone derivatives, aromatic amine derivatives, stilbene derivatives, butadiene derivatives, and enamine derivatives, and further include compounds each made up of two or more of these compounds bonded together or polymers each including, in the main chain or a side chain thereof, a group constituted of any of these compounds. Preferred of these are carbazole derivatives, aromatic amine derivatives, stilbene derivatives, butadiene derivatives, enamine derivatives, and compounds each made up of two or more of these compounds bonded together. Specific examples of suitable structures of the charge transport substance are shown below. The following examples are mere examples, and any known charge transport substance may be used so long as the use thereof does not depart from the spirit of the invention. Incidentally, Me means a methyl group, and Et means an ethyl group.

[Chem. 20]

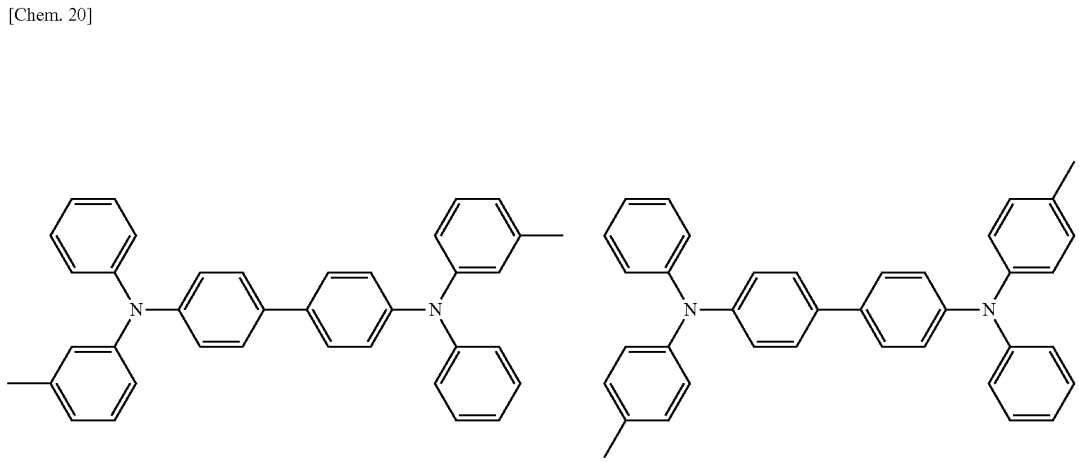

-continued
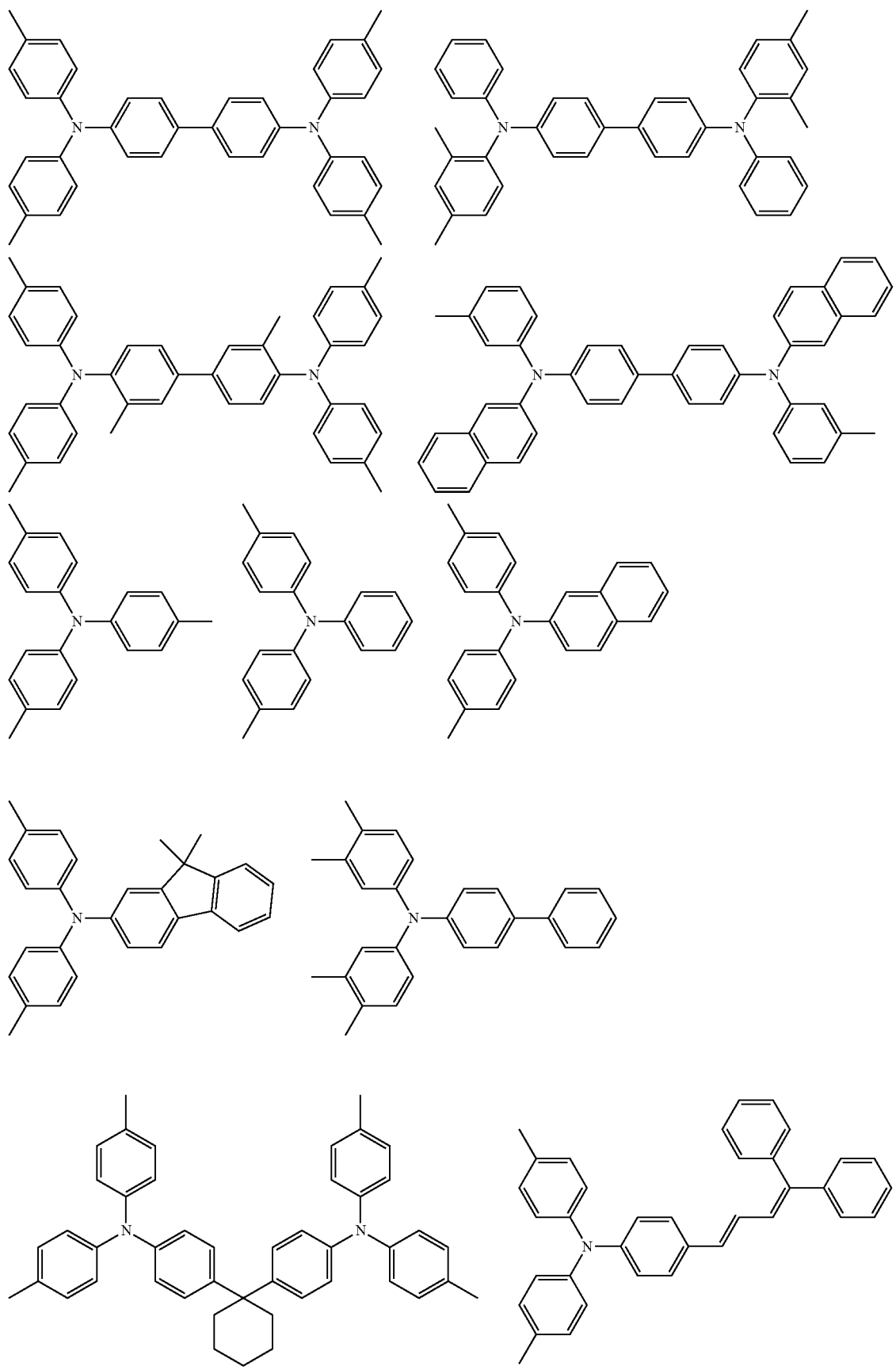

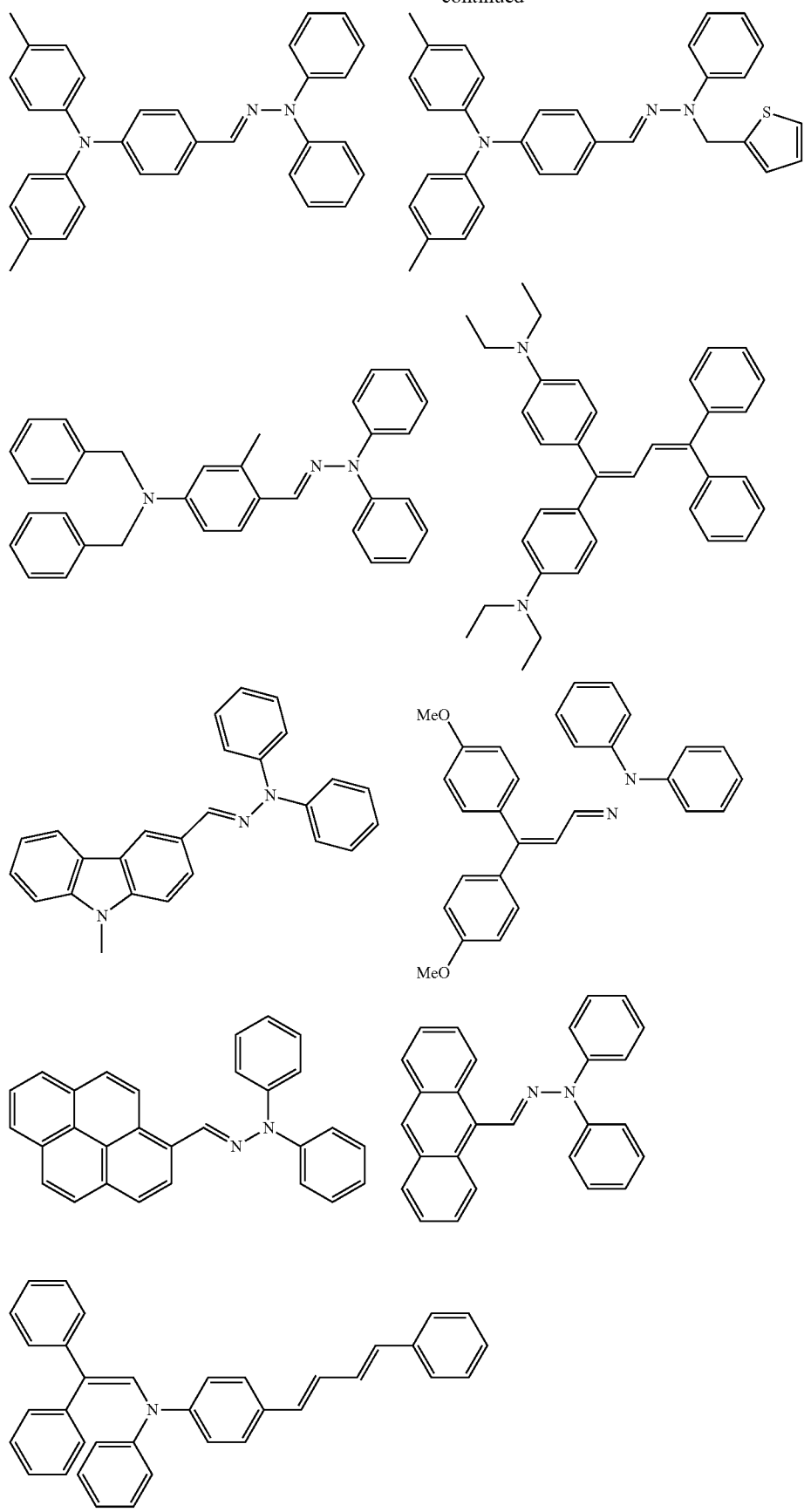

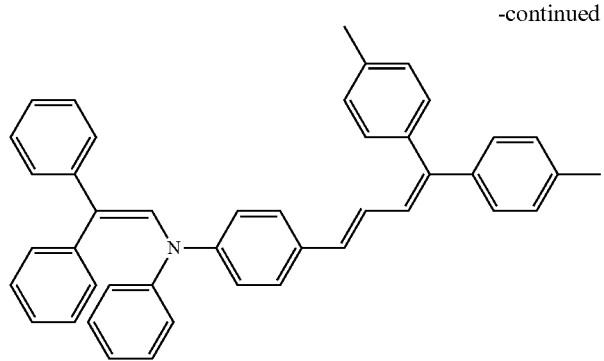
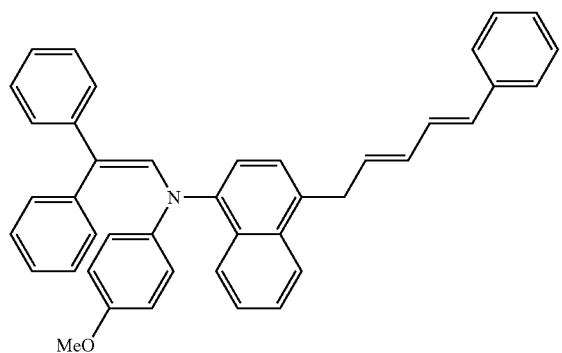
[Chem. 21]
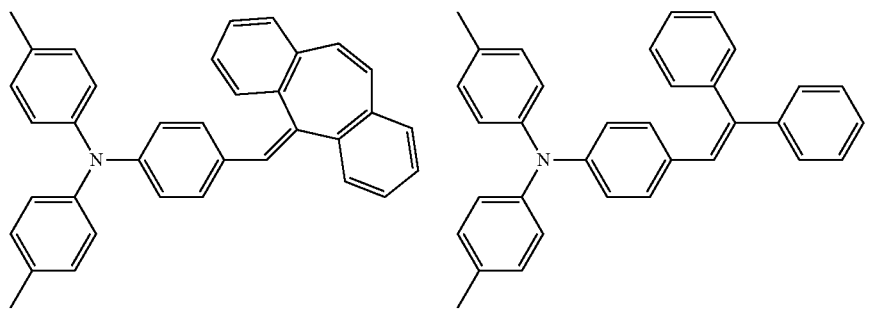
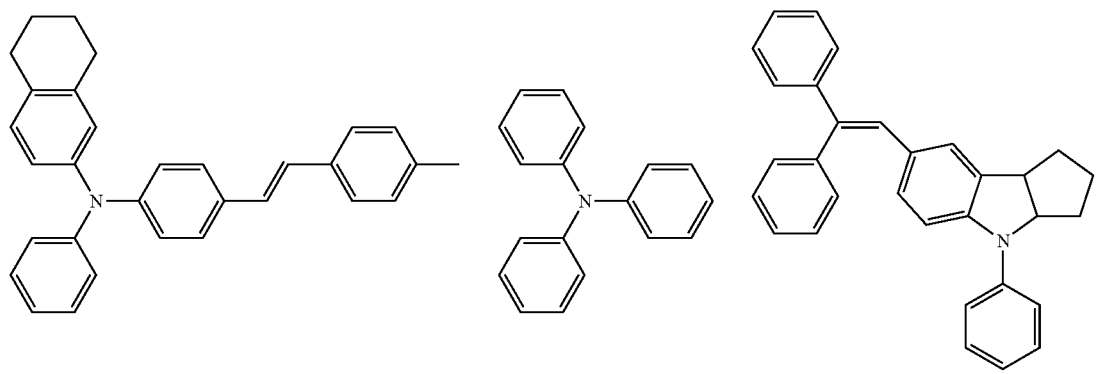

-continued
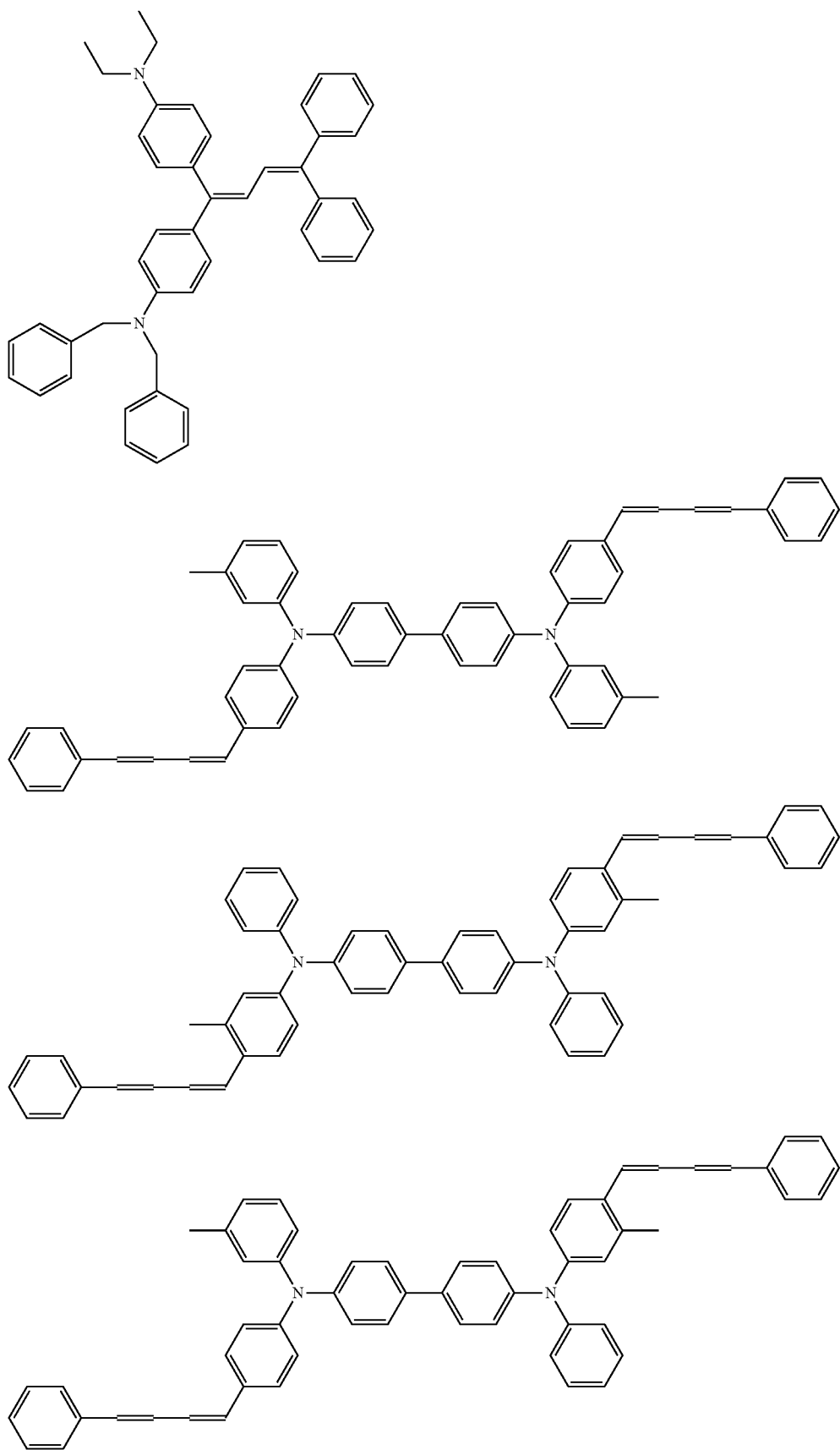

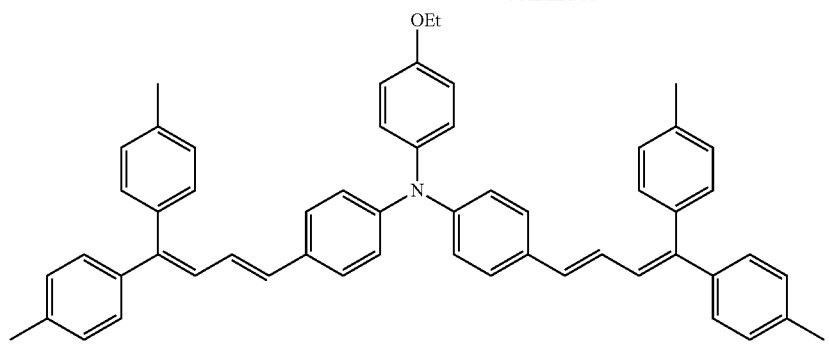
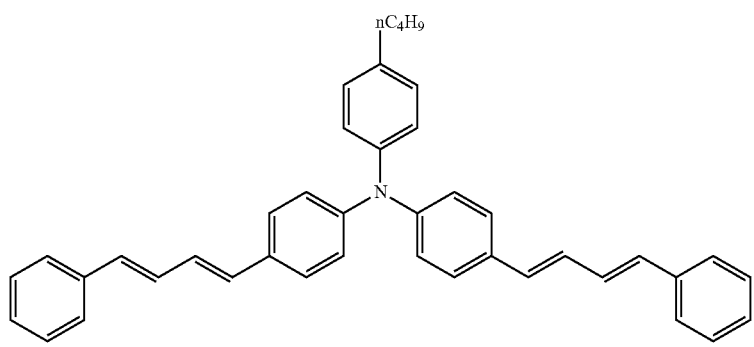
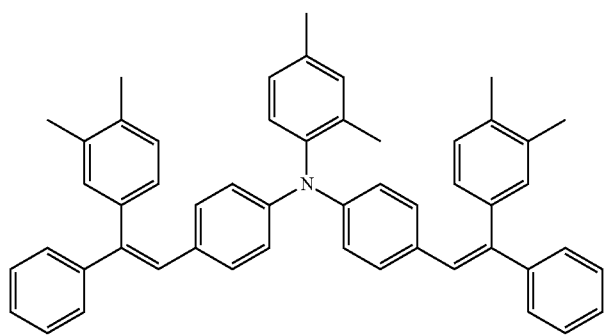
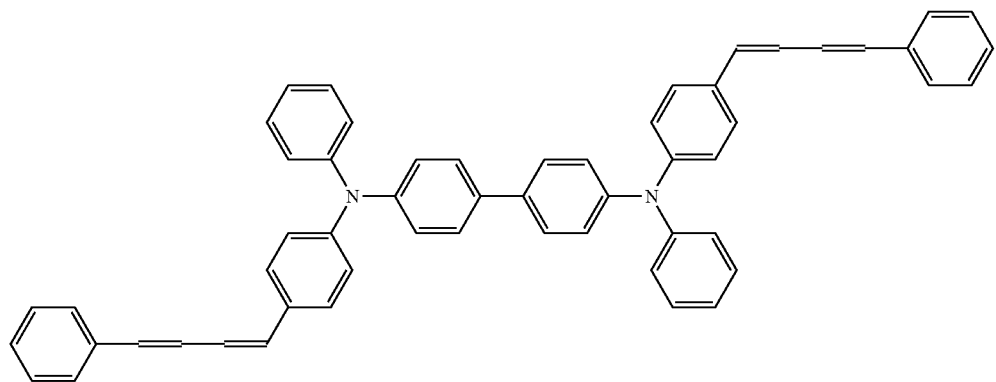

-continued
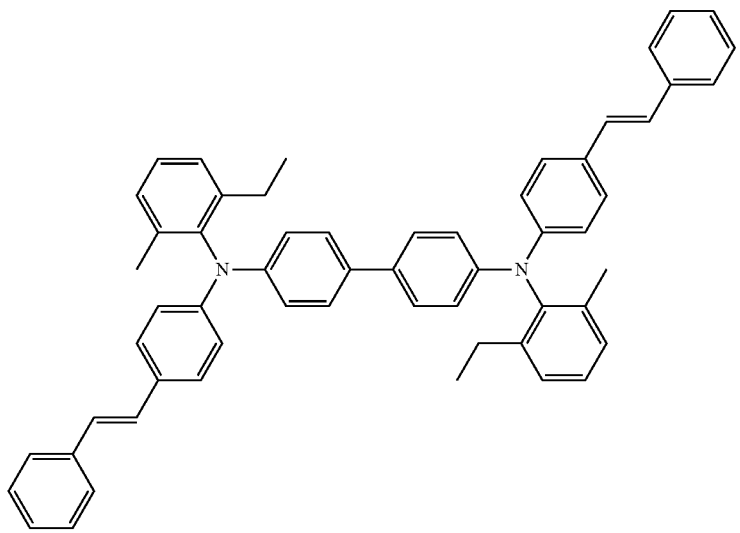
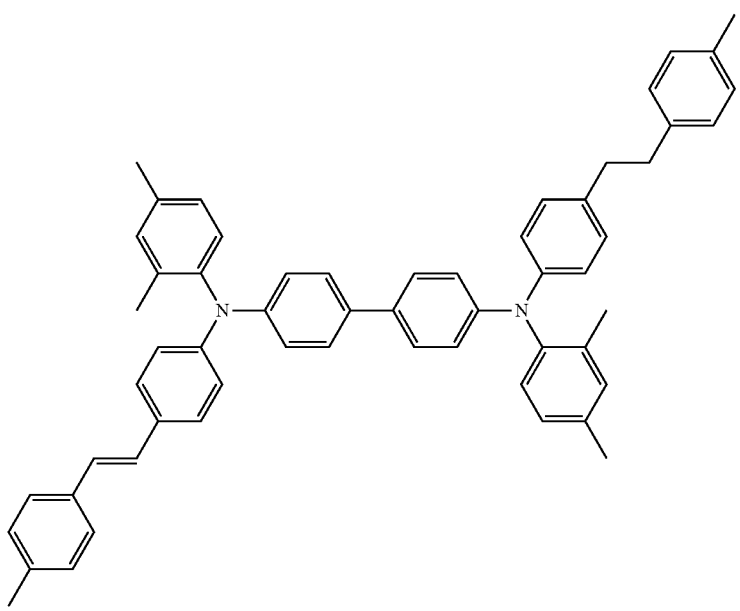
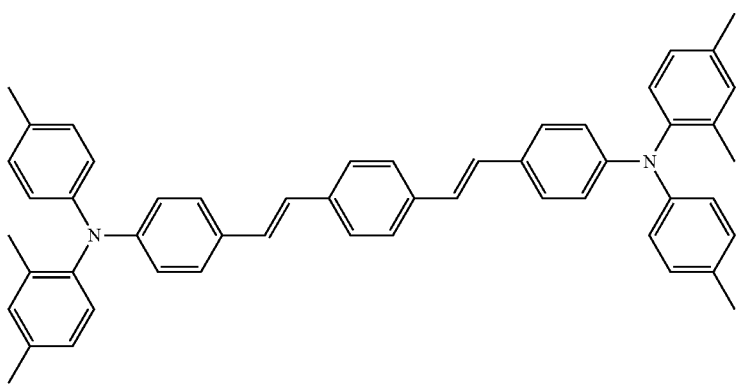

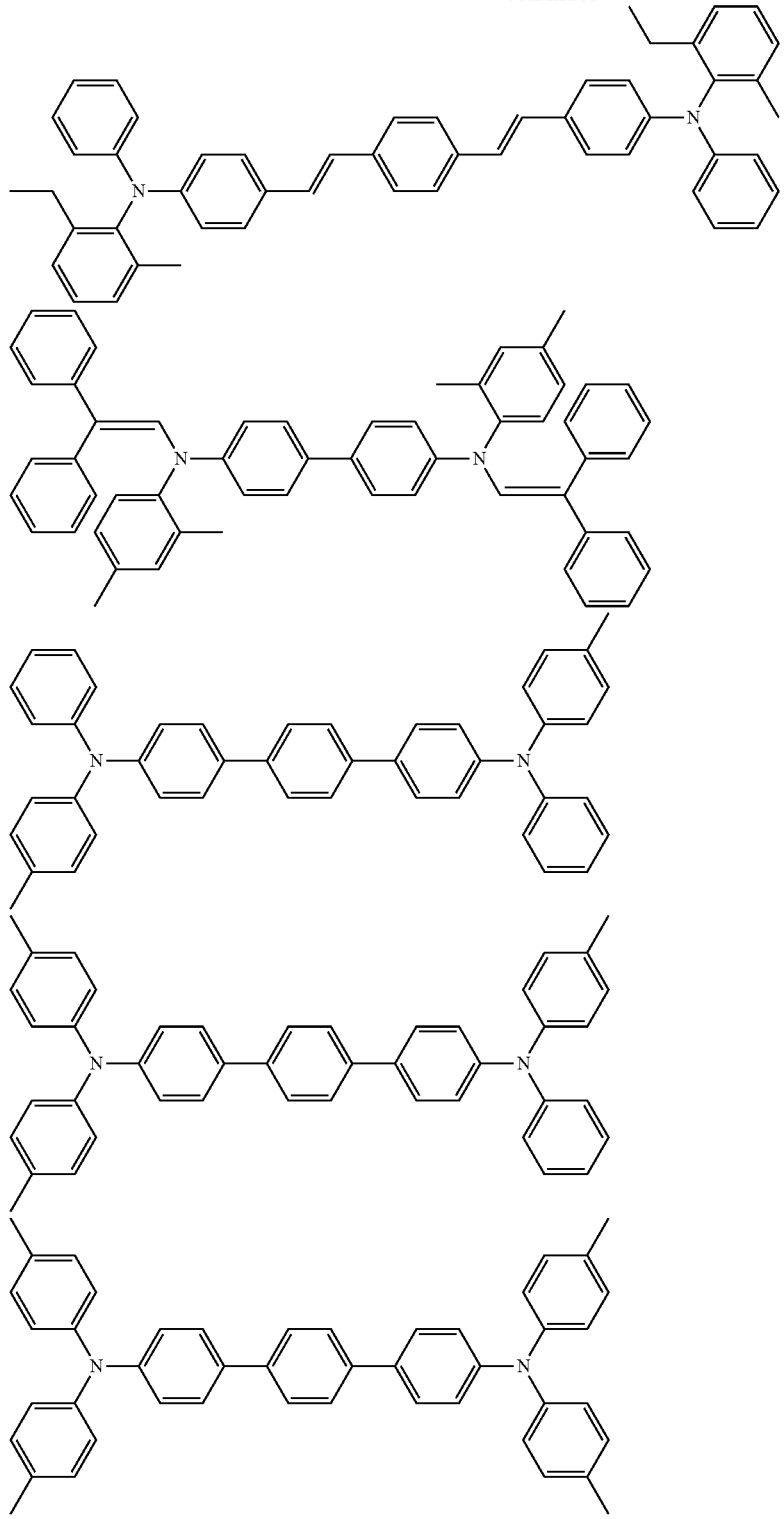

Examples of the charge transport substance contained in the charge transport layer that is a constituent component of the photosensitive layer of the electrophotographic photoreceptor to which this embodiment is applied include the arylamine-based compounds described in JP-A-9-244278, the arylamine-based compounds described in JP-A-2002- 275133, and the enamine-based compounds described in JP-A-2009-20504. One of these charge transport substances may be used alone, or some of these may be mixed together. It is preferable, from the standpoint of electrical properties during repetitions, that the charge transport substance should include at least one charge transport substance selected from the compounds represented by the following formulae (CT1) to (CT3), of the compounds enumerated above.

[Chem. 22]

(CT1)

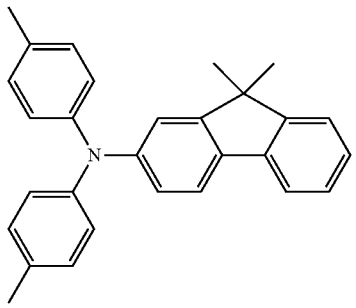

(CT2)

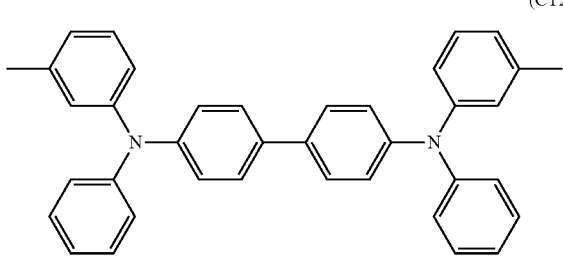

(CT3)

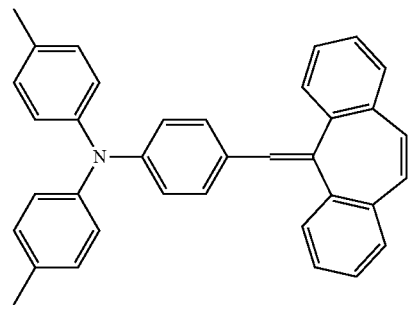

The charge transport layer is configured of these charge transport substances bound with a binder resin. The charge transport layer may be constituted of a single layer, or may be a plurality of superposed layers differing in constituent components or in component proportion.

It is also possible to use, as a binder resin, a mixture of the polyarylate resin having a repeating structure represented by formula (1) with other resin(s). Examples of the resins having other structures to be mixed include: vinyl polymers such as poly(methyl methacrylate), polystyrene, and poly(vinyl chloride) or copolymers thereof; and thermoplastic resins or various thermosetting resins, such as polycarbonate resins, polyester resins, polyarylate resins, polyester/polycarbonate resins, polysulfone resins, phenoxy resins, epoxy resins, and silicone resins. Preferred of these resins are polycarbonate resins and polyarylate resins.

Specific examples of suitable structures of the resins having other structures are shown below. The following examples are mere examples, and any known binder resin may be mixed and used so long as the use thereof does not depart from the spirit of the invention.

[Chem. 23]

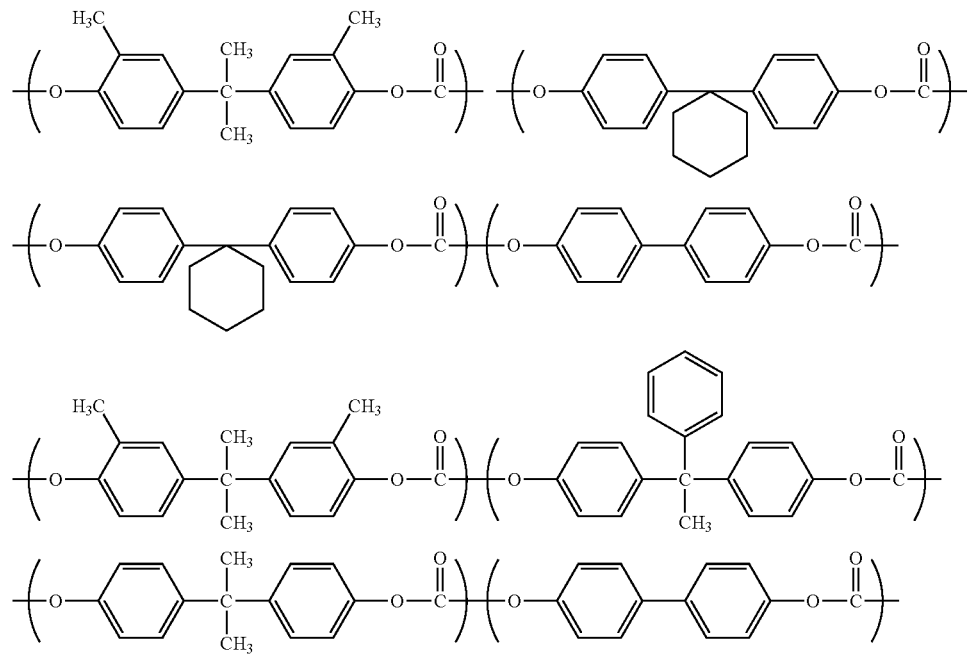

In the case where the polyarylate resin of the invention is used in combination with other binder resin, there are no limitations on the proportions thereof. These resins may be used in any desired proportion so long as the effects of the invention are obtained.

With respect to the ratio between the polyarylate resin having a repeating structure represented by formula (1) and the charge transport substance is as follows. The charge transport substance is used in a proportion of usually 10 parts by mass or larger per 100 parts by mass of the polyarylate resin. In particular, the proportion thereof is preferably 20 parts by mass or larger from the standpoint of reducing residual potential, and is more preferably 30 parts by mass or larger form the standpoints of stability in repeated use and charge mobility. Meanwhile, from the standpoint of the thermal stability of the photosensitive layer, the charge transport substance is used usually in a proportion of 120 parts by mass or less. In particular, the proportion thereof is preferably 100 parts by mass or less from the standpoint of compatibility between the charge transport substance and the binder resin, and is more preferably 70 parts by mass or less from the standpoint of printing durability, and is especially preferably 50 parts by mass or less from the standpoint of scratch resistance.

The thickness of the charge transport layer is usually 5-50 μm, preferably 10-45 μm. Known additives such as a plasticizer, antioxidant, ultraviolet absorber, electron-attracting compound, dye, pigment, filler, e.g., organic/inorganic particles, and leveling agent may be incorporated into the charge transport layer in order to improve film-forming properties, flexibility, applicability, nonfouling properties, gas resistance, light resistance, etc. Examples of the antioxidant include hindered phenol compounds and hindered amine compounds. Examples of the dye and pigment include various colorant compounds and azo compounds.

<Other Functional Layers>

Known additives such as an antioxidant, plasticizer, ultraviolet absorber, electron-attracting compound, leveling agent, and visible-light-shielding agent may be incorporated into each of the layers constituting the multilayer type photoreceptor, for the purpose of improving film-forming properties, flexibility, applicability, nonfouling properties, gas resistance, light resistance, etc.

Another layer may be further disposed as an outermost layer on the multilayer type photoreceptor. For example, a protective layer may be disposed for the purpose of preventing the photosensitive layer form being damaged or wearing or of preventing or lessening the deterioration of the photosensitive layer caused by, for example, discharge products released from the charging device, etc. The protective layer may be configured of an appropriate binder resin and a conductive material incorporated thereinto. Alternatively, use can be made of a copolymer obtained using a compound having charge-transporting ability, such as those described in JP-A-9-190004 and JP-A-10-252377, e.g., a triphenylamine framework.

As the conductive material for the protective layer, use can be made, for example, of an aromatic amino compound such as TPD (N,N'-diphenyl-N,N'-bis(m-tolyl)benzidine) or a metal oxide such as antimony oxide, indium oxide, tin oxide, titanium oxide, tin oxide-antimony oxide, aluminum oxide, or zinc oxide. However, the conductive material is not limited to these substances.

As the binder resin for the protective layer, use can be made of a known resin such as a polyamide resin, polyurethane resin, polyester resin, polyarylate resin, epoxy resin, polyketone resin, polycarbonate resin, poly(vinyl ketone) resin, polystyrene resin, polyacrylamide resin, or siloxane resin. Also usable is a copolymer of a framework having charge-transporting ability, such as those described in JP-A-9-190004 and JP-A-10-252377, e.g., a triphenylamine framework, with any of those resins.

It is preferable that the electrical resistance of the protective layer should be regulated so as to be in the range of usually $10^9$-$10^{14}$ Ω·cm. In case where the electrical resistance thereof is higher than that range, there is a possibility that the photoreceptor might have an elevated residual potential to give fogged images. Meanwhile, in case where the electrical resistance thereof is lower than that range, there is a possibility that image blurring and a decrease in resolution might result. It is preferable that the protective layer should be configured so as not to substantially prevent the transmission of the light with which the photoreceptor is irradiated for imagewise exposure.

Furthermore, a fluororesin, silicone resin, polyethylene resin, or the like, particles of any of these resins, or particles of an inorganic compound may be incorporated into the surface layer for the purposes of reducing the frictional resistance or wear of the photoreceptor surface, heightening the efficiency of toner transfer from the photoreceptor to a transfer belt and to paper, etc. Alternatively, a layer which includes any of these resins or contains these particles may be newly formed as a surface layer.

It is a matter of course that the photoreceptor may further have, according to need, layers for improving the electrical properties or mechanical properties, such as interlayers, e.g., a barrier layer, adhesion layer, and blocking layer, and a transparent insulating layer.

<Method for Forming the Layers>

The layers constituting the photoreceptor may be formed by repeatedly and successively performing application and drying steps, in which a coating fluid obtained by dissolving or dispersing, in a solvent, substances to be incorporated is applied to a support by a known method, e.g., dip coating, spray coating, nozzle coating, bar coating, roll coating, or blade coating, and dried to form each layer.

The solvent or dispersion medium to be used for producing the coating fluids is not particularly limited. Specific examples thereof include alcohols such as methanol, ethanol, propanol, and 2-methoxyethanol, ethers such as tetrahydrofuran, 1,4-dioxane, and dimethoxyethane, esters such as methyl formate and ethyl acetate, ketones such as acetone, methyl ethyl ketone, and cyclohexanone, aromatic hydrocarbons such as benzene, toluene, and xylene, chlorinated hydrocarbons such as dichloromethane, chloroform, 1,2-dichloroethane, 1,1,2-trichloroethene, 1,1,1-trichloroethane, tetrachloroethane, 1,2-dichloropropane, and trichloroethylene, nitrogen-containing compounds such as n-butylamine, isopropanolamine, diethylamine, triethanolamine, ethylenediamine, and triethylenediamine, and aprotic polar solvents such as acetonitrile, N-methylpyrrolidone, N,N-dimethylformamide, and dimethyl sulfoxide. One of these solvents or dispersion media may used alone, or any desired combination of two or more thereof may be used.

The amount of the solvent or dispersion medium to be used is not particularly limited. It is, however, preferred to suitably regulate the amount thereof so that properties of the coating fluid, such as solid concentration and viscosity, are within desired ranges, while taking account of the purpose of each layer and the properties of the solvent or dispersion medium selected.

In the case of the charge generation layer, the solid concentration of the coating fluid is usually 0.1% by mass or higher, preferably 1% by mass or higher, and is usually 15% by mass or less, preferably 10% by mass or less. The viscosity of the coating fluid is usually 0.01 cps or higher, preferably 0.1 cps or higher, and is usually 20 cps or less, preferably 10 cps or less.

In the case of the charge transport layer, the solid concentration of the coating fluid is usually 5% by mass or higher, preferably 10% by mass or higher, and is usually 40% by mass or less, preferably 35% by mass or less. The viscosity of the coating fluid is usually 10 cps or higher, preferably 50 cps or higher, and is usually 500 cps or less, preferably 400 cps or less.

Examples of methods for applying the coating fluids include dip coating, spray coating, spinner coating, bead coating, wire-wound bar coating, blade coating, roller coating, air-knife coating, and curtain coating. However, it is also possible to use other known coating techniques.

With respect to the drying of each coating fluid, it is preferable that after room-temperature drying to the touch, the coating layer should be dried with heating usually at a temperature in the range of 30-200° C. for a period of from 1 minutes to 2 hours either in a stationary atmosphere or with air blowing. The heating temperature may be constant, or the heating for drying may be performed while changing the temperature.

<3. Image Forming Apparatus and Cartridge>

Next, an embodiment of the image forming apparatus (image forming apparatus of the invention) which employs the electrophotographic photoreceptor of the invention is explained using FIG. 1, which shows the configuration of important portions of the apparatus. However, the embodiment should not be construed as being limited to the following explanations, and the apparatus can be modified at will unless the modifications depart from the spirit of the invention.

As shown in FIG. 1, the image forming apparatus has been configured so as to include an electrophotographic photoreceptor 1, a charging device 2, an exposure device 3, and a developing device 4. Furthermore, a transfer device 5, a cleaning device 6, and a fixing device 7 are provided to the apparatus according to need.

The electrophotographic photoreceptor 1 is not particularly limited so long as the photoreceptor 1 is the electrophotographic photoreceptor of the invention described above. In FIG. 1 is shown, as an example thereof, a drum-shaped photoreceptor configured of a cylindrical conductive support and, formed on the surface thereof, the photosensitive layer described above. The charging device 2, exposure device 3, developing device 4, transfer device 5, and cleaning device 6 have been disposed along the peripheral surface of the electrophotographic photoreceptor 1.

The charging device 2 is a device for charging the electrophotographic photoreceptor 1, and evenly charges the surface of the electrophotographic photoreceptor 1 to a given potential. Frequently used as the charging device is a corona charging device such as a corotron or a scorotron, a direct charging device (contact type charging device) in which a direct charging member to which a voltage is being applied is brought into contact with the photoreceptor surface to thereby charge the surface, a contact type charging device such as a charging brush, or the like. Examples of the direct charging means include contact charging devices such as charging rollers and charging brushes. FIG. 1 shows a roller type charging device (charging roller) as an example of the charging device 2. As a direct charging means, use can be made of either one which is accompanied with aerial discharge or injection charging which is not accompanied with aerial discharge. As the voltage to be applied for the charging, a direct-current voltage only can be used or an alternating current superimposed on a direct current is also usable.

The exposure device 3 is not particularly limited in the kind thereof so long as the exposure device is capable of exposing the electrophotographic photoreceptor 1 to light to form an electrostatic latent image in the photosensitive surface of the electrophotographic photoreceptor 1. Examples thereof include halogen lamps, fluorescent lamps, lasers such as semiconductor lasers and He—Ne lasers, and LEDs. Exposure may be conducted by an internal photoreceptor exposure technique. The light to be used for the exposure is not limited. For example, the exposure may be performed with monochromatic light having a wavelength of 780 nm, monochromatic light having a slightly short wavelength of 600-700 nm, monochromatic light having a short wavelength of 380-500 nm, or the like. Use of light having a short wavelength of 380-500 nm, among these, is preferred because higher resolution is obtained therewith. Especially suitable is monochromatic light of 405 nm.

The developing device 4 is not particularly limited in the kind thereof, and any desired device can be used. Use can be made of a dry development technique such as cascade development, development with a one-component insulated toner, development with a one-component conductive toner, or two-component magnetic-brush development, a wet development technique, or the like. In FIG. 1, the developing device 4 includes a developing vessel 41, agitators 42, a feed roller 43, a developing roller 44, and a control member 45, and has been configured so that a toner T is retained in the developing vessel 41. According to need, a replenisher (not shown) for replenishing with toner T may be provided to the developing device 4. This replenisher is configured so that the developing device 4 can be replenished with toner T form a vessel such as a bottle or a cartridge.

The feed roller 43 is constituted of, for example, a conductive sponge. The developing roller 44 is constituted of, for example, a metallic roll, such as an iron, stainless-steel, aluminum, or nickel roll, or a resinous roll obtained by coating such a metallic roll with a silicone resin, urethane resin, fluororesin, or the like. The surface of this developing roller 44 may be smoothed or roughened according to need.

The developing roller 44 has been disposed between the electrophotographic photoreceptor 1 and the feed roller 43, and is in contact with both the electrophotographic photoreceptor 1 and the feed roller 43. The feed roller 43 and the developing roller 44 are rotated by a rotating/driving mechanism (not shown). The feed roller 43 holds the toner T retained in the developing vessel and supplies the toner T to the developing roller 44. The developing roller 44 holds the toner T supplied by the feed roller 43 and brings the toner T into contact with the surface of the electrophotographic photoreceptor 1.

The control member 45 is constituted of a resinous blade made of a silicone resin, urethane resin, or the like, a metallic blade made of stainless steel, aluminum, copper, brass, phosphor bronze, or the like, a blade obtained by coating such a metallic blade with a resin, or the like. This control member 45 is in contact with the developing roller 44 and is pushed toward the developing roller 44 with springs or the like at a given force (general blade linear pressures are 5-500 g/cm). According to need, this control member 45 may have a function whereby the toner T is charged due to friction between the control member and the toner T.

The agitators 42 are each rotated by the rotating/driving mechanism. The agitators 42 stir the toner T and convey the toner T to the feed roller 43 side. A plurality of agitators 42 differing in blade shape, size, etc. may be disposed.

The transfer device 5 is not particularly limited in the kind thereof, and use can be made of a device employing any desired transfer technique such as an electrostatic transfer technique, pressure transfer technique, or adhesive transfer technique, e.g., corona transfer, roller transfer, or belt transfer. Here, the transfer device 5 is constituted of a transfer charger, transfer roller, transfer belt, or the like which has been disposed so as to face the electrophotographic photoreceptor 1. This transfer device 5, to which a given voltage (transfer voltage) having the polarity reverse to that of the charge potential of the toner T is applied, serves to transfer the toner image formed on the electrophotographic photoreceptor 1 to recording paper (paper or medium) P. Compared to apparatus operated in the mode involving an intermediate transfer body, the apparatus operated in the direct transfer mode has a feature wherein the number of transfers is smaller by one so that the decrease in image quality due to transfer can be diminished and wherein the mechanism is simple and this is advantageous from the standpoints of cost and size reduction. Meanwhile, the direct transfer mode has many limitations on the kinds of transfer media, and there is a demerit in that fatigue due to repetitions of the transfer results in impaired electrical properties in the case where the transfer medium has a small size or the apparatus is a high-speed machine. However, this problem can be mitigated by using the photoreceptor described above.

The cleaning device 6 is not particularly limited, and use can be made of any desired cleaning device such as a brush cleaner, magnetic brush cleaner, electrostatic brush cleaner, magnetic roller cleaner, or blade cleaner. The cleaning device 6 scrapes off the residual toner adherent to the photoreceptor 1 with a cleaning member and recovers the residual toner. However, in the case where there is only slight or almost no toner remaining on the photoreceptor surface, the cleaning device 6 may be omitted.

The fixing device 7 is configured of an upper fixing member (fixing roller) 71 and a lower fixing member (fixing roller) 72, and a heater 73 has been provided to the inside of the fixing member 71 or 72. FIG. 1 shows an example in which a heater 73 has been provided to the inside of the upper fixing member 71. As each of the upper and lower fixing members 71 and 72, use can be made of a known thermal fixing member such as a fixing roll obtained by coating a pipe of a metal such as stainless steel or aluminum with a silicone rubber, a fixing roll obtained by further coating with a Teflon (registered trademark) resin, or a fixing sheet. Furthermore, the fixing members 71 and 72 each may be configured so that a release agent such as a silicone oil is supplied thereto in order to improve the releasability, or may be configured so that the fixing members are forcedly pressed against each other with springs or the like.

The toner transferred to the recording paper P passes through the nip between the upper fixing member 71 heated at a given temperature and the lower fixing member 72, during which the toner is heated until the toner comes into a molten state. After the passing, the toner is cooled and fixed to the surface of the recording paper P.

The fixing device also is not particularly limited in the kind thereof, and it is possible to dispose, besides the device used here, a fixing device operated in any desired mode, such as hot-roller fixing, flash fixing, oven fixing, or pressure fixing.

In the electrophotographic apparatus having the configuration described above, an image is recorded in the following manner. First, the surface (photosensitive surface) of the photoreceptor 1 is charged to a given potential (e.g., −600 V) by the charging device 2. In this case, the surface may be charged with a direct-current voltage or with an alternating-current voltage superimposed on a direct-current voltage.

Subsequently, the charged photosensitive surface of the photoreceptor 1 is exposed to light by the exposure device 3 in accordance with the image to be recorded, thereby forming an electrostatic latent image in the photosensitive surface. This electrostatic latent image formed in the photosensitive surface of the photoreceptor 1 is developed by the developing device 4.

The developing device 4 forms the toner T supplied by the feed roller 43 into a thin layer with the control member (developing blade) 45 and simultaneously frictionally charges the toner T to a given polarity (here, negative polarity, which is the same as the polarity of the charge potential of the photoreceptor 1). The developing device 4 then conveys the toner T supported on the developing roller 44, and brings the toner T into contact with the surface of the photoreceptor 1.

Upon the contact of the charged toner T supported on the developing roller 44 with the surface of the photoreceptor 1, a toner image corresponding to the electrostatic latent image is formed on the photosensitive surface of the photoreceptor 1. This toner image is transferred to recording paper P by the transfer device 5. Thereafter, the toner remaining untransferred on the photosensitive surface of the photoreceptor 1 is removed by the cleaning device 6.

After the transfer of the toner image to the surface of the recording paper P, this recording paper P is passed through the fixing device 7 to thermally fix the toner image to the surface of the recording paper P, thereby obtaining a final image.

Besides having the configuration described above, the image forming apparatus may be configured so that an erase step, for example, can be performed. The erase step is a step in which the electrophotographic photoreceptor is exposed to light to thereby remove residual electricity from the electrophotographic photoreceptor. As an eraser, use is made of a fluorescent lamp, LEDs, or the like. The light to be used in the erase step frequently is light having an intensity which is at least 3 times in terms of exposure energy the intensity of the exposure light.

The image forming apparatus may be configured so as to include further modifications. For example, the apparatus may be configured so that steps such as a pre-exposure step and an auxiliary charging step can be conducted or that offset printing is performed. Furthermore, the apparatus may be made to include a full-color tandem configuration in which a plurality of toners is used.

The electrophotographic photoreceptor 1 may be combined with one or more of a charging device 2, an exposure device 3, a developing device 4, a transfer device 5, a cleaning device 6, and a fixing device 7 to configure an integrated cartridge (hereinafter suitably referred to as "electrophotographic photoreceptor cartridge"), and this electrophotographic photoreceptor cartridge may be configured so as to be capable of being mounted on and demounted from the main body of an electrophotographic apparatus, e.g., a copier or a laser beam printer. In this case, when, for example, the electrophotographic photoreceptor 1 or another member has deteriorated, this electrophotographic photoreceptor cartridge is demounted from the main body of the image forming apparatus and a fresh electrophotographic photoreceptor cartridge is mounted on the main body of the image forming apparatus. Thus, the maintenance and management of the image forming apparatus are facilitated.

EXAMPLES

Embodiments of the invention are explained below in more detail by reference to Examples, but the invention should not be construed as being limited by the following Examples unless the invention departs from the spirit thereof
<Production of Hydroxygallium Phthalocyanines and Polyarylate Resins>
Production of Hydroxygallium Phthalocyanines Production Example 1

To 200 mL of dimethyl sulfoxide were added 34.6 g of 1,3-diiminoisoindoline and 10 g of gallium trichloride. The mixture was reacted at 160° C. for 4 hours. After this liquid reaction mixture was cooled to room temperature, 4.6 g of a 5.0% by weight aqueous solution of sodium hypochlorite was added thereto. The resultant liquid reaction mixture was filtered, and the crystals obtained were washed with 300 mL of methanol and 100 mL of ion-exchanged water and then dried, thereby obtaining 21.2 g of chlorogallium phthalocyanine.
A 4.0 g portion of the chlorogallium phthalocyanine obtained was dissolved in 160 g of concentrated sulfuric acid at −10° C., and the resultant solution was dropped into 1,200 g of distilled water having a temperature of 5° C. to cause crystals to separate out. The crystals were washed with distilled water, dilute ammonia water, etc. and then dried to obtain 3.6 g of hydroxygallium phthalocyanine.
A 2.0 g portion of the hydroxygallium phthalocyanine obtained was subjected to a 30-hour milling treatment with a sand grinding mill together with 30 mL of dimethyl formamide and 55 g of glass beads. The treated hydroxygallium phthalocyanine was taken out by filtration, washed twice with 100 mL of methanol, and dried to obtain 1.9 g of V-form hydroxygallium phthalocyanine (A). An X-ray powder diffraction pattern of the hydroxygallium phthalocyanine (A) obtained is shown in FIG. 2.

Production Example 2

In a nitrogen atmosphere, 32 g of o-phthalodinitrile and 10 g of gallium trichloride were added to 164 g of α-chloronaphthalene, and this mixture was reacted at 205° C. for 5 hours. The resultant liquid reaction mixture was cooled to 150° C. and filtered. The crystals obtained were washed with 150 mL of N-methylpyrrolidone and with 150 mL of methanol, and then dried to thereby obtain 11.5 g of chlorogallium phthalocyanine.
The chlorogallium phthalocyanine obtained was subjected to a treatment with concentrated sulfuric acid and a milling treatment in the same manner as in Production Example 1 to obtain 1.9 g of V-form hydroxygallium phthalocyanine (B). An X-ray powder diffraction pattern of the hydroxygallium phthalocyanine (B) obtained is shown in FIG. 3.
Production of Polyarylate Resins
[Method for Analyzing Starting-Material Monomers]
The purity and by-product contents of each of the starting-material monomers, including bisphenols, used in the Examples, etc. were determined by the following method.
The purity of each starting-material monomer was determined by preparing a 1% acetone solution of a specimen and examining the solution with a gas chromatograph. The proportion of the area of each peak to the total area of the peaks assigned to the starting-material monomer was taken as the content.
Apparatus: Shimadzu GC17A
Column: DB-5 (30 m×0.25 mm (diameter), 0.25 μm)
Detector: FID
In order to identify by-products, analysis by GC/MS was performed.
Apparatus: Agilent 6890/5975
Column: DB-1HT (15 m x 0.25 mm (diameter), 0.1 μm)
Detector: MSD SCAN method (EI)
The results of the analysis are shown in Table 1.

TABLE 1

| No. of Production Example where the monomer was used | Starting-material monomer | Purity of starting-material bisphenol (%) | Content of by-product | |
|---|---|---|---|---|
| | | | Monomethyl structure (%) | Trimethyl structure (ppm) |
| Production Example 3 | Bis-C(1) | 99.54 | 0.45 | N.D. |
| Comparative Production Example 1 | Bis-C(2) | 99.87 | 0.12 | 20 |

In Table 1, "N.D." means that the by-product was not detected. The structure of the starting-material bisphenol, monomethyl structure, and trimethyl structure in the table are shown below. In the following formulae, X each represent a single bond, $-CR^1R^2-$, O, CO, or S. Furthermore, $R^1$ and $R^2$ each independently represent a hydrogen atom, a methyl group, or an ethyl group, or $R^1$ and $R^2$ represent a cyclohexylidene group formed by the $R^1$ and $R^2$ bonded to each other.

[Chem. 24]

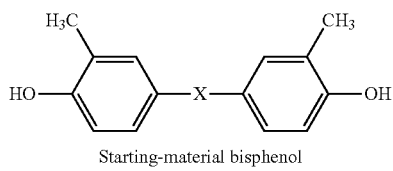

Starting-material bisphenol

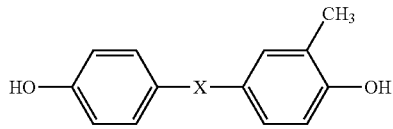

Monomethyl structure

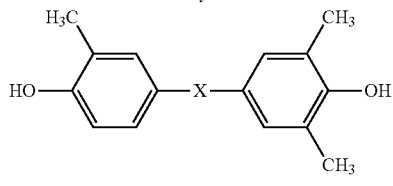

Trimethyl structure

[Polymerization]

Production Example 3 (Production of Polyarylate Resin (1))

Sodium hydroxide (6.20 g) and H₂O (235 mL) were introduced into a 500-mL beaker, and the sodium hydroxide was dissolved with stirring. Thereto were added 2,3,5- trimethylphenol (0.36 g), starting-material monomer Bis-C (1) {2,2-bis(3-methyl-4-hydroxyphenyl)propan} (16.18 g), and benzyltriethylammonium chloride (0.168 g) in this order. These ingredients were dissolved with stirring. Thereafter, this aqueous alkali solution was transferred to a 1-L reaction vessel.

Separately therefrom, a mixture solution of terephthaloyl chloride (6.55 g) and isophthaloyl chloride (6.55 g) in dichloromethane (117 mL) was transferred to a dropping funnel.

While keeping the external temperature of the reaction vessel at 20° C. and stirring the aqueous alkali solution within the reaction vessel, the dichloromethane solution was dropped thereinto from the dropping funnel over 30 minutes. After the stirring was continued for further 1 hour, dichloromethane (196 mL) was added thereto and this mixture was continuously stirred for 4 hours. Thereafter, the stirring was stopped, and the mixture was allowed to stand for 30 minutes. Subsequently, and organic layer was separated therefrom. This organic layer was washed with 0.1-N hydrochloric acid (240 mL) three times and then with desalted water (240 mL) twice.

The organic layer washed was diluted by adding 230 mL of methylene chloride thereto, and the diluted organic layer was poured into methanol (2,100 mL) The sediment obtained was taken out by filtration and dried to obtain the desired polyarylate resin (1). Analytical data on the polyarylate resin (1) obtained are shown in Table 2. The structural formula of the polyarylate resin (1) is shown below.

[Chem. 25]

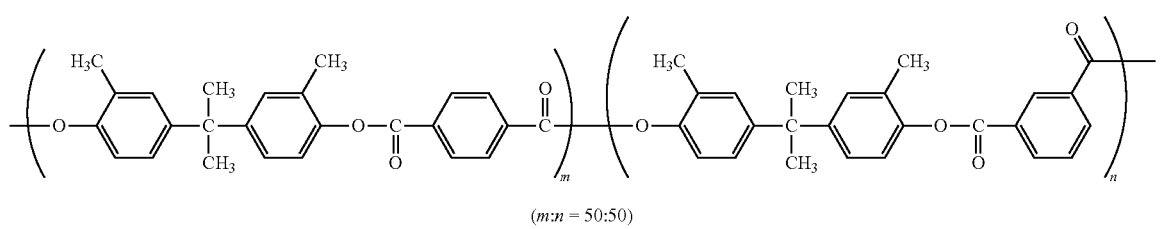

Polyarylate resin (1)

($m:n$ = 50:50)

Production Example 4 Production of Polyarylate Resin (2)

The same synthesis procedure as in Production Example 3 was conducted, except that the starting-material monomer Bis-C(1) (16.18 g) was replaced with a mixture of starting-material monomer Bis-C(1) (11.33 g) and starting-material monomer Bis-C(2) (4.85 g). Thus, a polyarylate resin (2) was obtained. Analytical data on the polyarylate resin (2) obtained are shown in Table 2.

Comparative Production Example 1 (Production of Polyarylate Resin (3))

The same synthesis procedure as in Production Example 3 was conducted, except that the starting-material monomer Bis-C(1) was replaced with starting-material monomer Bis-C(2). Thus, a polyarylate resin (3) was obtained. Analytical data on the polyarylate resin (3) obtained are shown in Table 2.

Production Example 5 Production of Polyarylate Resin (4)

The same synthesis procedure as in Production Example 3 was conducted, except that the starting-material monomer Bis-C(1) (16.18 g) was replaced with a mixture of starting-material monomer Bis-C(1) (4.85 g) and starting-material monomer Bis-C(2) (11.33 g). Thus, a polyarylate resin (4) was obtained. Analytical data on the polyarylate resin (4) obtained are shown in Table 2.

[Analysis]

The viscosity-average molecular weight, content of terminal carbonyl chloride groups, content of terminal OH groups, and content of terminal carboxy groups of each of the polyarylate resins, hydrolysis of the polyarylate, and bisphenol purity were determined by the following methods.

[Determination of Viscosity-average Molecular Weight (Mv)]

The polyarylate resin was dissolved in dichloromethane to prepare a solution having a concentration C of 6.00 g/L. Using an Ubbeholde viscometer having a solvent (dichloromethane) flow time $t_0$ of 136.16 sec, the specimen solution was examined for flow time t in a thermostatic water bath set at 20.0° C. The viscosity-average molecular weight (Mv) thereof was calculated in accordance with the following equations.

$$a=0.438 \times \eta_{sp}+1 \quad \eta_{sp}=t/t_0-1$$

$$b=100 \times \eta_{sp}/C \quad C=6.00 \text{ (g/L)}$$

$$\eta=b/a$$

$$Mv=3207 \times \eta^{1.205}$$

[Determination of Content of Terminal Carbonyl Chloride Groups [CF (µeq/g)]]

About 1.5 g of the polyarylate was precisely weighed, and 20 mL of methylene chloride was added thereto to dissolve the polyarylate. Thereto was added 2 mL of a 1% methylene chloride solution of 4-(p-nitrobenzyl)pyridine. The whole amount was adjusted to 25 mL. This mixture was allowed to color over 30 minutes and then examined for absorbance at a wavelength of 450 nm using a spectrophotometer (UV-1200, manufactured by Shimadzu Corp.). Separately therefrom, a methylene chloride solution of benzoyl chloride was used to determine the absorptivity coefficient, and the content of CF groups in the resin was determined therefrom.

[Determination of Content of Terminal OH Groups [OH (µeq/g)]]

About 0.2 g of the polyarylate was precisely weighed and dissolved in 10 mL of methylene chloride. Thereto was added 5 mL of a 5% methylene chloride solution of acetic acid. Furthermore, 10 mL of a solution of titanium tetrachloride (*1) was added thereto to cause the mixture to color. Thereafter, the whole amount was adjusted to 25 mL. This solution was examined for absorbance at a wavelength of 480 nm using a spectrophotometer (UV-1200, manufactured by Shimadzu Corp.). (*1: mixture solution obtained by mixing 200 mL of methylene chloride, 22 mL of a 5% methylene chloride solution of acetic acid, and 5.5 mL of titanium chloride).

Separately therefrom, a methylene chloride solution of bisphenol compounds (composition) having the same makeup as the polyarylate resin being examined was used to determine the absorptivity coefficient thereof, and the content of OH groups in the resin was determined.

[Determination of Content of Terminal Carboxy Groups [COOH (µeq/g)]]

About 0.4 g of the polyarylate resin was precisely weighed in a tall beaker, and 25 mL of benzyl alcohol was added thereto. The resin was dissolved by heating with a 195° C. oil bath. After it was ascertained that the resin had been completely dissolved, the beaker was taken out of the oil bath and the solution was cooled. After the cooling, 2 mL of ethyl alcohol was gently introduced into the tall beaker along the wall thereof. Using an automatic titrator (GT100, manufactured by Mitsubishi Chemical Corp.), the resultant solution was titrated with a 0.01-N benzyl alcohol solution of NaOH. Separately therefrom, the benzyl alcohol solvent only was titrated with the 0.01-N benzyl alcohol solution of NaOH to determine a blank value. The factor of the 0.01-N benzyl alcohol solution of NaOH was determined by the following method.

(1) 0.01-N hydrochloric acid (reagent for volumetric analysis; known normal solution ($F_{HCL}=1$)) is introduced with whole pipettes into tall beakers for titration precisely in amounts of 1, 2, and 4 mL.
(2) To each of these are added 25 mL of benzyl alcohol and 2 mL of ethyl alcohol.
(3) Using the automatic titrator (GT100, manufactured by Mitsubishi Chemical Corp.), each mixture was titrated with the 0.01-N benzyl alcohol solution of NaOH.
(4) Calculation: The amount of the NaOH benzyl alcohol titrant (Y-axis) is plotted against the amount of the prepared hydrochloric acid solution in (1) (X-axis), and the slope of the plot is expressed by S.

Factor F of 0.01-N benzyl alcohol solution of NaOH=$F_{HCL}/S$

.COOH groups=$\{(A-B)\times F\times 10\}/W$ (µeq/g)

A: Titrant amount for specimen (mL)
B: Titrant amount for blank (mL)
F: Factor of the 0.01-N benzyl alcohol solution of NaOH
W: Amount of the polyarylate resin (g)

[Hydrolysis of Polyarylate Resin and Analysis of Bisphenol for Purity]

About 0.1 g of the polyarylate was weighed, and 4.9 g of methanol was added thereto. Thereto was added 0.1 g of a 28% sodium methoxide solution in methanol (manufactured by Wako Pure Chemical Ltd.). Thereafter, the mixture was stirred at 50° C. for 7 hours to conduct a hydrolysis reaction. Subsequently, the reaction mixture was cooled to room temperature, and 0.05-0.1 g of acetic acid was then added thereto to neutralize the mixture.

The solution which had undergone the hydrolysis was examined with a gas chromatograph to determine the purity of the bisphenol. The proportion of the area of each peak to the total area of the peaks assigned to bisphenol monomer was taken as the content. The peaks assigned to the bisphenol monomer were identified from the results of the analysis of the starting-material bisphenol.

Apparatus: Shimadzu GC 17A
Column: DB-5 (30 m x 0.25 mm (diameter), 0.25 µm)
Detector: FID

TABLE 2

| | Divalent | | Polyarylate yielded | | | | | Bisphenol after hydrolysis | | |
| | Divalent carboxylic | | | | | | | | Monomethyl | Trimethyl |
| | phenol residue | acid residue | Resin No. | Mv | CF (µeq/g) | OH (µeq/g) | COOH (µeq/g) | Dimethyl form (%) | form (%) | form (%) |
|---|---|---|---|---|---|---|---|---|---|---|
| Production Example 3 | Bis-C(1) | TPA/IPA | polyarylate (1) | 37000 | 0.004 | 3.4 | 14.6 | 99.54 | 0.45 | N.D. |
| Production Example 4 | Bis-C(1)/ (2) = 7/3 | TPA/IPA | polyarylate (2) | 35100 | 0.001 | 2.9 | 11.1 | 99.63 | 0.36 | 7 |
| Comparative Production Example 1 | Bis-C(2) | TPA/IPA | polyarylate (3) | 33000 | 0.006 | 5.0 | 15.5 | 99.87 | 0.12 | 20 |
| Production Example 5 | Bis-C(1)/ (2) = 3/7 | TPA/IPA | polyarylate (4) | 35000 | 0.008 | 2.3 | 16.6 | 99.76 | 0.23 | 15 |

Bis-C: 2,2-bis(3-methyl-4-hydroxyphenyl)propane
TPA: terephthalic acid
IPA: isophthalic acid <Production of Photoreceptor Sheets>

Example 1

A dispersion for undercoat layer formation was produced in the following manner. Rutile-type titanium oxide having an average primary particle diameter of 40 nm ("TTO55N", manufactured by Ishihara Sangyo Co. Ltd.) and methyldimethoxysilane ("TSL8117", manufactured by Toshiba Silicone Co., Ltd.), the amount of which was 3% by mass based on the titanium oxide, were introduced into a high-speed flow type mixer/kneader ("SMG300", manufactured by Kawata MFG Co., Ltd.) and mixed together at a high peripheral rotation speed of 34.5 m/sec to obtain a surface-treated titanium oxide. This surface-treated titanium oxide was dispersed with a ball mill of methanol/1-propanol to thereby obtain a dispersion slurry of a hydrophobized titanium oxide. The dispersion slurry, a methanol/1-propanol/toluene mixed solvent, and pellets of a copolyamide were stirred and mixed, with heating, to dissolve the polyamide pellets, the copolyamide being configured of ε-caprolactam [compound represented by the following formula (A)]/bis (4-amino-3-methylcyclohexyl)methane [compound represented by the following formula (B)]/hexamethylenediamine [compound represented by the following formula (C)]/decamethylenedicarboxylic acid [compound represented by the following formula (D)]/octadecamethylenedicarboxylic acid [compound represented by the following formula (E)] in a molar ratio of 75%/9.5%/3%/9.5%/3%. Thereafter, the mixture was subjected to an ultrasonic dispersion treatment, thereby obtaining a dispersion for undercoat layer formation in which the methanol/1-propanol/toluene mass ratio was 7/1/2 and which contained the hydrophobized titanium oxide and the copolyamide in a former/latter mass ratio of 3/1 and had a solid concentration of 18.0%.

[Chem. 26]

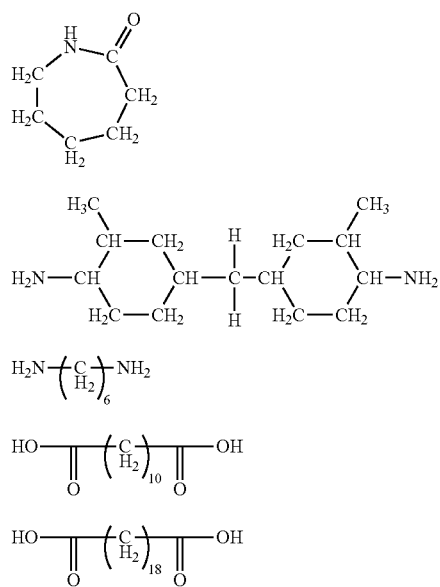

A coating fluid for charge generation layer formation was produced in the following manner. Twenty parts by mass of the hydroxygallium phthalocyanine (A) produced in Production Example 1 was mixed as a charge generation substance with 280 parts by mass of 1,2-dimethoxyethane. This mixture was subjected to 1-hour pulverization with a sand grinding mill to perform a pulverization/dispersion treatment. Subsequently, the resultant fine dispersion was mixed with a binder solution obtained by dissolving 10 parts by mass of poly(vinyl butyral) (trade name, "Denka Butyral" #6000C; manufactured by Denki Kagaku Kogyo K.K.) in a mixed solvent composed of 255 parts by mass of 1,2-dimethoxyethane and 85 parts by mass of 4-methoxy-4-methyl-2-pentanone and further with 230 parts by mass of 1,2-dimethoxyethane to prepare a coating fluid for charge generation layer formation.

A coating fluid for charge transport layer formation was produced in the following manner. Forty parts by mass of the compound represented by the following formula (CT1) and 40 parts by mass of the compound represented by the following formula (CT2) were mixed as charge transport substances with 640 parts by mass of a tetrahydrofuran/toluene mixed solvent (tetrahydrofuran, 80% by mass; toluene, 20% by mass) together with 100 parts by mass of the polyarylene resin (1) produced in Production Example 3, 8 parts by mass of an antioxidant (trade name, Irganox 1076; manufactured by Ciba Specialty Chemicals Co.), and 0.05 parts by mass of a silicone oil (trade name, KF96; manufactured by Shin-Etsu Chemical Co., Ltd.). Thus, a coating fluid for charge transport layer formation was prepared.

[Chem. 27]

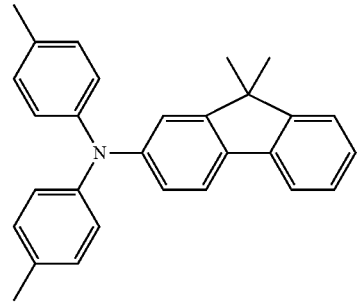

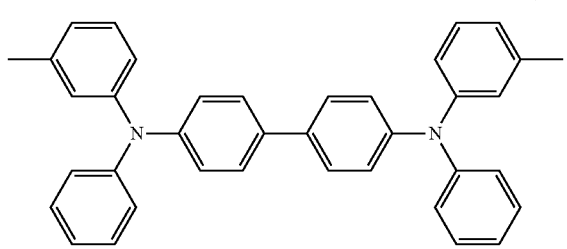

Subsequently, the coating fluid for undercoat layer formation obtained in the manner described above was applied to a poly(ethylene terephthalate) sheet which had a surface coated with vapor-deposited aluminum, in such an amount as to result in a dry film thickness of about 1.5 μm. The coating fluid applied was dried at room temperature to form an undercoat layer.

Furthermore, the coating fluid for charge generation layer formation obtained in the manner described above was applied to the undercoat layer in such an amount as to result in a dry film thickness of about 0.3 μm, and dried at room temperature to form a charge generation layer.

Subsequently, the coating fluid for charge transport layer formation was applied to the charge generation layer with an applicator in such an amount as to result in a dry film thickness of 25 μm, and dried at 125° C. for 20 minutes to form a charge transport layer. Thus, a photoreceptor sheet was produced.

Example 2

A photoreceptor sheet was produced in the same manner as in Example 1, except that the charge generation substance was replaced with the hydroxygallium phthalocyanine (B) produced in Production Example 2.

Comparative Example 1

A photoreceptor sheet was produced in the same manner as in Example 1, except that the polyarylate resin (1) was replaced with the polyarylate resin (3).

Comparative Example 2

A photoreceptor sheet was produced in the same manner as in Example 2, except that the polyarylate resin (1) was replaced with the polyarylate resin (3).

Example 3

A photoreceptor sheet was produced in the same manner as in Example 1, except that the polyarylate resin (1) was replaced with the polyarylate resin (4).

Example 4

A photoreceptor sheet was produced in the same manner as in Example 1, except that the polyarylate resin (1) was replaced with the polyarylate resin (2).

Example 5

A photoreceptor sheet was produced in the same manner as in Example 1, except that Y-form (also called D-form) oxytitanium phthalocyanine (C) which, when analyzed by X-ray diffractometry with a CuKα line, showed an intense diffraction peak at a Bragg angle (2θ±0.2) of 27.3° was used in place of the charge generation substance (A).

Comparative Example 3

A photoreceptor sheet was produced in the same manner as in Example 5, except that the polyarylate resin (1) was replaced with the polyarylate resin (3).

Example 6

A photoreceptor sheet was produced in the same manner as in Example 1, except that the 40 parts by mass of charge transport substance (CT1) and 40 parts by mass of charge transport substance (CT2) were replaced with 70 parts by mass of charge transport substance (CT1) and 10 parts by mass of the following charge transport substance (CT3).

[Chem. 28]

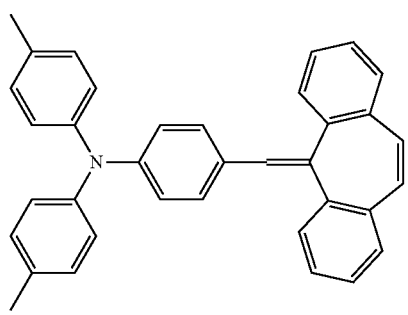

(CT3)

Example 7

A photoreceptor sheet was produced in the same manner as in Example 1, except that 50 parts by mass of the following charge transport substance (CT4) was used in place of the 40 parts by mass of charge transport substance (CT1) and 40 parts by mass of charge transport substance (CT2).

[Chem. 29]

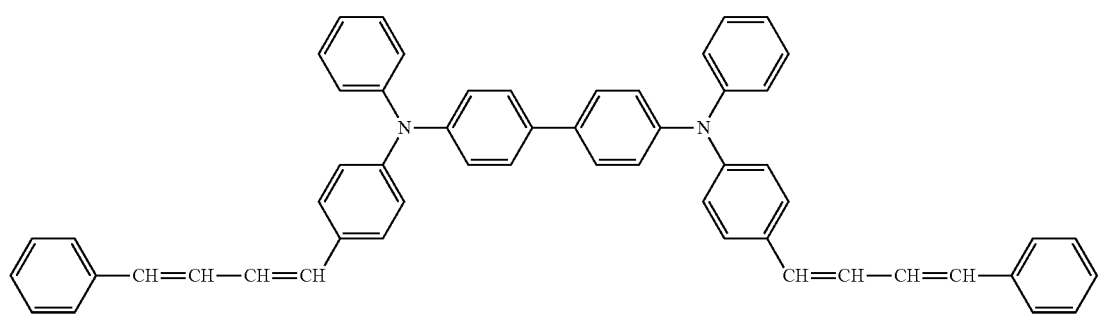

(CT4)

[Evaluation of Initial Electrical Properties]

An apparatus for electrophotographic-property evaluation produced in accordance with the measurement standards of The Society of Electrophotography of Japan (described in The Society of Electrophotography of Japan, ed., Zoku Denshi Shashin Gijutsu No Kiso To Oyo, Corona Publishing Co., Ltd., pp. 404-405) was used. The photoreceptor sheet was adhered to the aluminum drum and thereby formed into a cylindrical shape. The aluminum drum was electrically connected to the aluminum base of the photoreceptor. Thereafter, the drum was rotated at a constant rotation speed to conduct a test for evaluating electrical properties through cycling which included charging, exposure, potential measurement, and erase. In the test, the initial surface potential was regulated to −700 V, and monochromatic light of 780 nm and monochromatic light of 660 nm were used for exposure and erase, respectively. The light potential (VL) at the time when the photoreceptor had been irradiated with the exposure light in an amount of 0.92 µJ/cm² was measured. For the VL measurement, the time period from the exposure to the potential measurement was set at 139 ms. Furthermore, the irradiation energy required for the surface potential to become half (i.e., −350 V) of the initial surface potential value (half-decay exposure energy: µJ/cm²) was measured as sensitivity ($E_{1/2}$). The smaller the absolute value of VL, the better the electrical properties. The smaller the value of $E_{1/2}$, the higher the sensitivity. The measurement was made in an atmosphere having a temperature of 25° C. and a relative humidity of 50% (N/N). The results obtained are shown in Table 3.

[Evaluation of Electrical Properties During Repetitions]

An apparatus for electrophotographic-property evaluation produced in accordance with the measurement standards of The Society of Electrophotography of Japan (described in The Society of Electrophotography of Japan, ed., *Zoku Denshi Shashin Gijutsu No Kiso To Ōyō*, Corona Publishing Co., Ltd., pp. 404-405) was used. The photoreceptor sheet was adhered to the aluminum drum having a diameter of 80 mm and thereby formed into a cylindrical shape. The aluminum drum was electrically connected to the aluminum base of the photoreceptor sheet. Thereafter, the drum was rotated at a constant rotation speed of 60 rpm, and cycling which included charging, exposure, potential measurement, and erase was repeatedly conducted 30,000 times. Before and after the repetitions of the cycling, the photoreceptor was evaluated for property. At the beginning of this test, the charging (scorotron charging device) conditions were fixed so that the photoreceptor had an initial surface potential of about −700 V. A difference (ΔV0) in measured surface potential (V0) was determined. The smaller the absolute value of ΔV0, the better the charging properties during repeated use. The measurement was made in an atmosphere having a temperature of 25° C. and a relative humidity of 50%. The results of the measurement are shown in Table 3.

[Evaluation of Transfer Memory]

After the test for evaluating initial electrical properties was performed, the erase part was demounted and a corotron to which +6.5 kV was being applied was disposed instead in order to simulate transfer load. The apparatus in this state was subjected 4,000 times to cycling which included charging, exposure, and transfer load, and was then subjected again to the VL measurement to determine a difference AVL from the initial value. The measurement was made in an atmosphere of 25° C. and 50% RH. The results thereof are shown in Table 3. The smaller the absolute value of AVL, the better the unsusceptibility to transfer memory.

which the surface had been roughly machine-finished and cleaned and which had an outer diameter of 30 mm, length of 376 mm, and wall thickness of 0.75 mm, in such amounts as to result in dry film thicknesses of 1.3 μm, 0.4 μm, and 25 μm, respectively, and dried to form an undercoat layer, a charge generation layer, and a charge transport layer. Thus, photoreceptor drums were produced. The drying for forming the charge transport layer was conducted at 125° C. for 20 minutes.

[Determination of Amount of Residual α-Chloronaphthalene]

One of the photoreceptor drums was immersed in acetone to remove acetone-soluble components contained in the charge transport layer, and the insoluble components and the swollen binder resin were peeled off Subsequently, a portion of the charge generation layer which corresponded to 100 cm$^2$ was immersed in 1,2-dimethoxyethane and subjected to an ultrasonic treatment to obtain a dispersion of the charge generation layer. The poly(vinyl butyral) resin which had dissolved was removed by filtration to isolate the hydroxygallium phthalocyanine pigment as an insoluble matter. The isolated pigment specimen was subjected to the identification and quantification of components thereof by the GC/MS (SIM) method. In the quantification, a calibration curve (peak area vs. detection intensity) was first drawn using α-chloronaphthalene references having known concentrations, and the amount of α-chloronaphthalene was calculated from the calibration curve and the peak area of the test sample. Incidentally, references were added before the test sample was isolated, and the degree of recovery was ascertained. The amount of the solvent detected was corrected using the recovery.

No residual α-chloronaphthalene was detected from the hydroxygallium phthalocyanine contained in the charge generation layer.

TABLE 3

|  | Charge generation substance | Binder resin/mono-methyl form (%)/ trimethyl form (ppm) | Charge transport substance | $E_{1/2}$ (μJ/cm$^2$) | VL (−V) | ΔV0 (−V) | ΔVL (−V) |
|---|---|---|---|---|---|---|---|
| Example 1 | (A) | (1)/0.45/N.D. | CT1/CT2 | 0.132 | 108 | 14 | 31 |
| Example 2 | (B) | (1)/0.45/N.D. | CT1/CT2 | 0.127 | 104 | 18 | 37 |
| Comparative Example 1 | (A) | (3)/0.12/20 | CT1/CT2 | 0.131 | 110 | 25 | 43 |
| Comparative Example 2 | (B) | (3)/0.12/20 | CT1/CT2 | 0.127 | 105 | 32 | 50 |
| Example 3 | (A) | (4)/0.23/15 | CT1/CT2 | 0.131 | 109 | 20 | 35 |
| Example 4 | (A) | (2)/0.36/7 | CT1/CT2 | 0.132 | 108 | 17 | 34 |
| Example 5 | (C) | (1)/0.45/N.D. | CT1/CT2 | 0.096 | 107 | 25 | 40 |
| Comparative Example 3 | (C) | (3)/0.12/20 | CT1/CT2 | 0.096 | 107 | 30 | 50 |
| Example 6 | (A) | (1)/0.45/N.D. | CT1/CT3 | 0.134 | 113 | 12 | 44 |
| Example 7 | (A) | (1)/0.45/N.D. | CT4 | 0.129 | 92 | 18 | 47 |

A comparison between Examples 1 and 2 and Comparative Examples 1 and 2 shows that the photoreceptors produced using a polyarylate resin for which starting-material bisphenol Bis-C(1) had been used have a satisfactory light potential (VL) and are satisfactory also in terms of charging property and transfer memory, among electrical properties during repetitions. Meanwhile, the photoreceptors produced using a polyarylate resin for which Bis-C(2) had been used are prone to deteriorate in charging property and transfer memory, as electrical properties during repetitions, although not so inferior in initial electrical property.

Example 8

<Production of Photoreceptor Drums>

The coating fluid for undercoat layer formation, coating fluid for charge generation layer formation, and coating fluid for charge transport layer formation which had been used for producing the photoreceptor of Example 1 were successively applied by dip coating on an aluminum cylinder in <Image Test>

An image test was conducted using tandem full-color printer MICROLINE 9800, manufactured by Oki Data Corp., which was operated in the dry-development electrophotographic mode at a printing speed of 243 mm/s, employed nonmagnetic one-component development, and included charging rollers and a conveyer belt, and in which toner images were directly transferred from the photoreceptors to paper.

The photoreceptor drums produced (four equal drums) were mounted in the electrophotographic photoreceptor cartridges for cyan, magenta, yellow, and black colors, and printing was conducted on 1,000 sheets of A4 paper with longitudinal feed in an atmosphere of 25° C. and 50% RH. Thereafter, sheets of A4 paper were fed by transverse feed to print a half-tone image over the whole surface. As a result, no image defects, e.g., a decrease in density in the areas corresponding to both ends of each photoreceptor, were observed. Furthermore, half-tone printing over the whole surface was conducted in a changed test atmosphere of 25° C. and 10% RH. As a result, no decrease in density was observed.

Example 9

<Production of Photoreceptor Drums>

Photoreceptor drums were produced in the same manner as in Example 8, except that the coating fluids were replaced with the coating fluids used for producing the photoreceptor of Example 2. Residual α-chloronaphthalene was detected in an amount of 0.2 ng/cm$^2$ from the hydroxygallium phthalocyanine contained in the charge generation layer.

<Image Test>

The photoreceptor drums (four equal drums) were mounted in the electrophotographic photoreceptor cartridges for cyan, magenta, yellow, and black colors in the same manner as in Example 8, and printing was conducted on 1,000 sheets of A4 paper with longitudinal feed in an atmosphere of 25° C. and 50% RH. Thereafter, sheets of A4 paper were fed by transverse feed to print a half-tone image over the whole surface. As a result, image defects such as a difference in density in end areas were observed only slightly to a degree which was not problematic. Furthermore, half-tone printing over the whole surface was conducted in a changed test atmosphere of 25° C. and 10% RH. As a result, no decrease in density was observed.

Comparative Example 5

<Production of Photoreceptor Drums>

Photoreceptor drums were produced in the same manner as in Example 8, except that the coating fluids were replaced with the coating fluids used for producing the photoreceptor of Comparative Example 1. No residual α-chloronaphthalene was detected from the hydroxygallium phthalocyanine contained in the charge generation layer.

<Image Test>

The photoreceptor drums (four equal drums) were mounted in the electrophotographic photoreceptor cartridges for cyan, magenta, yellow, and black colors in the same manner as in Example 8, and printing was conducted on 1,000 sheets of A4 paper with longitudinal feed in an atmosphere of 25° C. and 50% RH. Thereafter, sheets of A4 paper were fed by transverse feed to print a half-tone image over the whole surface. As a result, a decrease in density was observed in areas corresponding to the end portions which had repeatedly undergone a heavy transfer load, and image defects due to a difference in density were observed. Furthermore, half-tone printing over the whole surface was conducted in a changed test atmosphere of 25° C. and 10% RH. As a result, no resultant decrease in density was observed.

Comparative Example 6

<Production of Photoreceptor Drums>

Photoreceptor drums were produced in the same manner as in Example 8, except that the coating fluids were replaced with the coating fluids used for producing the photoreceptor of Comparative Example 2. Residual α-chloronaphthalene was detected in an amount of 0.3 ng/cm$^2$ from the hydroxygallium phthalocyanine contained in the charge generation layer.

<Image Test>

The photoreceptor drums (four equal drums) were mounted in the electrophotographic photoreceptor cartridges for cyan, magenta, yellow, and black colors in the same manner as in Example 8, and printing was conducted on 1,000 sheets of A4 paper with longitudinal feed in an atmosphere of 25° C. and 50% RH. Thereafter, sheets of A4 paper were fed by transverse feed to print a half-tone image over the whole surface. As a result, a decrease in density was observed in areas corresponding to the end portions which had repeatedly undergone a heavy transfer load, and image defects due to a difference in density were observed. Furthermore, half-tone printing over the whole surface was conducted in a changed test atmosphere of 25° C. and 10% RH. As a result, no resultant decrease in density was observed.

While the invention has been described in detail and with reference to specific embodiments thereof, it will be apparent to one skilled in the art that various changes and modifications can be made therein without departing from the spirit and scope thereof. This application is based on a Japanese patent application filed on Jul. 12, 2013 (Application No. 2013-146651,), a Japanese patent application filed on Sep. 12, 2013 (Application No. 2013-189584), and a Japanese patent application filed on Oct. 1, 2013 (Application No. 2013-206624), the contents thereof being incorporated herein by reference.

DESCRIPTION OF THE REFERENCE NUMERALS AND SIGNS

1 Photoreceptor
2 Charging device (charging roller)
3 Exposure device
4 Developing device
5 Transfer device
6 Cleaning device
7 Fixing device
41 Developing vessel
42 Agitator
43 Feed roller
44 Developing roller
45 Control member
71 Upper fixing member (pressure roller)
72 Lower fixing member (fixing roller)
73 Heater
T Toner
P Recording paper

The invention claimed is:

1. An electrophotographic photoreceptor, comprising:
a conductive support; and
at least a photosensitive layer on the conductive support,
wherein the photosensitive layer comprises a polyarylate resin and the polyarylate resin has a repeating structure represented by formula (1), a repeating structure represented by formula (3)', and a repeating structure represented by formula (4)',
wherein the polyarylate resin contains the repeating structure represented by formula (3)' in an amount of 0.2% to 1%, based on the total amount of the repeating structures represented by formula (2)' and formula (3)', which are each partial structures of formula (1), and
wherein the polyarylate resin contains the repeating structure represented by formula (4)' in an amount of 15 ppm or less, based on a total amount of the repeating structures represented by formula (2)', formula (3)', and formula (4)':

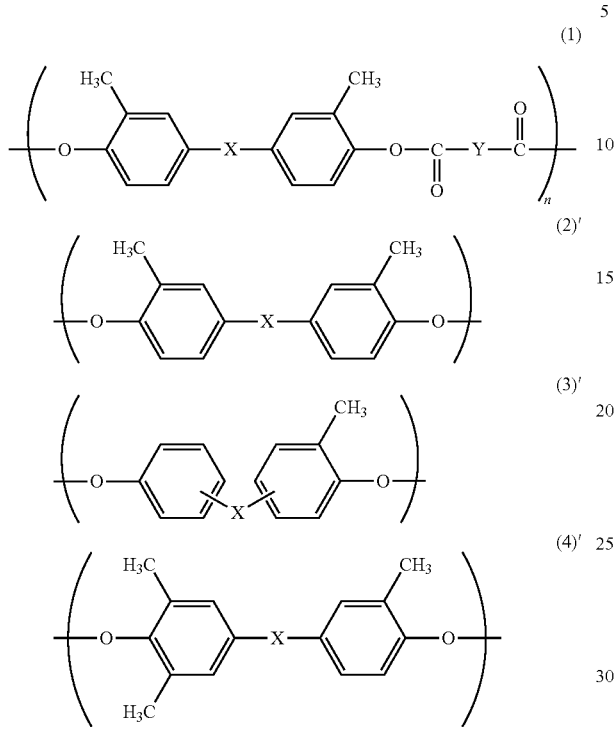

wherein formula (1):
each Y independently represents at least one divalent group selected from the group consisting of an m-phenylene group, a p-phenylene group, and a divalent group configured of two p-phenylene groups bonded to each other by an oxygen atom;
n indicates the number of repetitions;
each X independently represents a single bond, $-CR^1R^2-$, O, CO, or S; and
$R^1$ and $R^2$ each independently represent a hydrogen atom, a methyl group, or an ethyl group, or $R^1$ and $R^2$ represent a cyclohexylidene group formed by the $R^1$ and $R^2$ bonded to each other, and wherein in formula (2)', formula (3)', and formula (4)':
each X independently represents a single bond, $-CR^1R^2-$, O, CO, or S; and
$R^1$ and $R^2$ each independently represent a hydrogen atom, a methyl group, or an ethyl group, or $R^1$ and $R^2$ represent a cyclohexylidene group formed by the $R^1$ and $R^2$ bonded to each other.

2. The electrophotographic photoreceptor according to claim 1, wherein the amount of the repeating structure represented by formula (3)' is 0.3% to 0.8%, based on the total amount of repeating structures represented by formula (2)' and formula (3)'.

3. The electrophotographic photoreceptor according to claim 1, wherein the amount of the repeating structure represented by formula (3)' is 0.4% to 0.8%, based on the total amount of the repeating structures represented by formula (2)' and formula (3)'.

4. An electrophotographic photoreceptor, comprising:
a conductive support; and
at least a photosensitive layer on the conductive support, wherein the photosensitive layer comprises a polyarylate resin and the polyarylate resin has a repeating structure represented by formula (1), a repeating structure represented by formula (3)', and a repeating structure represented by formula (4)',
wherein the polyarylate resin contains the repeating structure represented by formula (4)' in an amount of 10 ppm or less, based on the total amount of the repeating structures represented by formula (2)', formula (3)', and formula (4)':

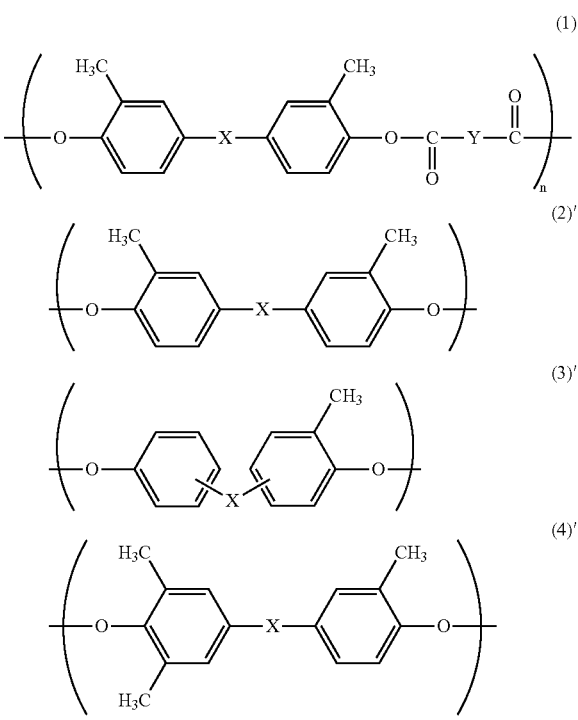

wherein in formula (1):
each Y independently represents at least one divalent group selected from the group consisting of an m-phenylene group, a p-phenylene group, and a divalent group configured of two p-phenylene groups bonded to each other by an oxygen atom;
n indicates the number of repetitions;
each X independently represents a single bond, $-CR^1R^2-$, O, CO, or S; and
$R^1$ and $R^2$ each independently represent a hydrogen atom, a methyl group, or an ethyl group, or $R^1$ and $R^2$ represent a cyclohexylidene group formed by the $R^1$ and $R^2$ bonded to each other, and wherein in formula (2)', formula (3)', and formula (4)':
each X independently represents a single bond, $-CR^1R^2-$, O, CO, or S; and
$R^1$ and $R^2$ each independently represent a hydrogen atom, a methyl group, or an ethyl group, or $R^1$ and $R^2$ represent a cyclohexylidene group formed by the $R^1$ and $R^2$ bonded to each other.

5. The electrophotographic photoreceptor according to claim 1, wherein the photosensitive layer is a laminate of a charge transport layer and a charge generation layer.

6. The electrophotographic photoreceptor according to claim 5, wherein the charge transport layer comprises at least one charge transport substance selected from the compounds represented by the following formulae (CT-1) to (CT-3):

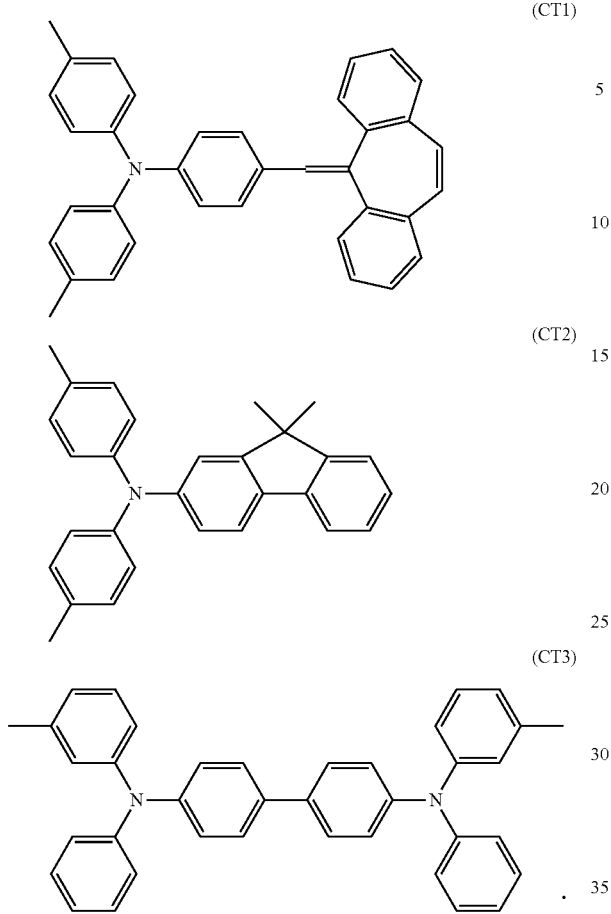

7. The electrophotographic photoreceptor according to claim 5, wherein the charge generation layer comprises hydroxygallium phthalocyanine, the hydroxygallium phthalocyanine being hydroxygallium phthalocyanine crystals which, in analysis by X-ray diffractometry using a CuKα line, has an intense diffraction peak at a Bragg angle (2θ±0.2) of 28.3°.

8. The electrophotographic photoreceptor according to claim 7, wherein the hydroxygallium phthalocyanine is synthesized using a non-halogen solvent.

9. The electrophotographic photoreceptor according to claim 7, wherein the hydroxygallium phthalocyanine pigment isolated from the charge generation layer has an α-chloronaphthalene content of 0.1 ng/cm² or less.

10. An image forming apparatus, comprising the electrophotographic photoreceptor according to claim 1.

11. The image forming apparatus according to claim 10, wherein in an electrophotographic process, a toner developed on the photoreceptor is directly transferred to a printing medium without via an intermediate transfer body.

12. A cartridge comprising the electrophotographic photoreceptor according to claim 1.

13. A polyarylate resin having repeating structures represented by the formula (1), formula (3)', and formula (4)', and containing the repeating structure represented by the formula (4)' in an amount of 10 ppm or less based on the total amount of the repeating structures represented by formula (2)', formula (3)', and formula (4)', which are each partial structures of formula (1):

wherein in formula (1):
each Y independently represents at least one divalent group selected from the group consisting of an m-phenylene group, a p-phenylene group, and a divalent group configured of two p-phenylene groups bonded to each other by an oxygen atom;

n indicates the number of repetitions;

each X independently represents a single bond, —CR$^1$R$^2$—, O, CO, or S; and

R$^1$ and R$^2$ each independently represent a hydrogen atom, a methyl group, or an ethyl group, or R$^1$ and R$^2$ represent a cyclohexylidene group formed by the R$^1$ and R$^2$ bonded to each other, and wherein in formula (2)', formula (3)', and formula (4)':
each X independently represents a single bond, —CR$^1$R$^2$—, O, CO, or S; and R$^1$ and R$^2$ each independently represent a hydrogen atom, a methyl group, or an ethyl group, or R$^1$ and R$^2$ represent a cyclohexylidene group formed by the R$^1$ and R$^2$ bonded to each other.

14. The polyarylate resin according to claim 13, wherein the repeating structure represented by formula (3)' is a repeating structure represented by formula (3a)':

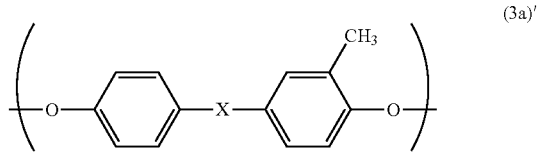

wherein in formula (3a)':
  each X independently represents a single bond, —$CR^1R^2$—, O, CO, or S; and
  $R^1$ and $R^2$ each independently represent a hydrogen atom, a methyl group, or an ethyl group, or $R^1$ and $R^2$ represent a cyclohexylidene group formed by the $R^1$ and $R^2$ bonded to each other.

* * * * *